United States Patent [19]

Sugiyama et al.

[11] Patent Number: 4,638,376

[45] Date of Patent: Jan. 20, 1987

[54] ROTARY RECORDING MEDIUM WHICH IS PLAYABLE IN STILL PICTURE, SLOW-MOTION AND NORMAL REPRODUCTION MODES

[75] Inventors: Hiroyuki Sugiyama, Isehara; Masaki Sakurai; Ryozo Abè, both of Yokohama; Kenji Yoshihara, Chiba; Yasuo Haneji, Kanagawa, all of Japan

[73] Assignee: Victor Company of Japan, Ltd., Yokohama, Japan

[21] Appl. No.: 818,057

[22] Filed: Jan. 10, 1986

Related U.S. Application Data

[63] Continuation of Ser. No. 433,872, Oct. 13, 1982, abandoned.

[30] Foreign Application Priority Data

| Oct. 14, 1981 | [JP] | Japan | 56-163999 |
| Oct. 14, 1981 | [JP] | Japan | 56-164000 |
| Oct. 14, 1981 | [JP] | Japan | 56-164001 |
| Oct. 14, 1981 | [JP] | Japan | 56-164002 |
| Oct. 14, 1981 | [JP] | Japan | 56-164003 |

[51] Int. Cl.$^4$ .............................................. H04N 5/76
[52] U.S. Cl. .................................... 358/342; 358/343; 360/10.1
[58] Field of Search ............... 358/342, 312, 313, 907, 358/343; 360/9.1, 10.1, 11.1, 19.1; 363/47, 48, 111

[56] References Cited

U.S. PATENT DOCUMENTS

| 4,142,209 | 3/1977 | Hedlund et al. | 358/342 |
| 4,286,281 | 8/1981 | Suzuki | 360/19 |
| 4,353,090 | 10/1982 | Broadbent | 358/342 |
| 4,402,018 | 8/1983 | Wada et al. | 358/346 |
| 4,423,497 | 12/1983 | Sugiyama et al. | 358/342 |
| 4,429,335 | 1/1984 | Sugiyama et al. | 358/342 |
| 4,510,531 | 4/1985 | Sugiyama | 358/342 |

FOREIGN PATENT DOCUMENTS

2016785 9/1979 United Kingdom.
2048547 12/1980 United Kingdom.
2086083 5/1982 United Kingdom.

OTHER PUBLICATIONS

"A Random Access System Adapted for the Optical Video Disc", Mathieu-SMPTE Journal, Feb. 1977, vol. 86, pp. 80–83.

Primary Examiner—Aristotelis M. Psitos
Attorney, Agent, or Firm—Louis Bernat

[57] ABSTRACT

A rotary recording medium comprises a video signal of the same unit repeatedly recorded for N-field period (N is a natural number greater than or equal to 2) for each track turn, a track shift address signal for instructing the existence of forced track shift of a pickup reproducing element, the shifting direction, and the shifting position, recorded on at least one position for one revolution of the rotary recording medium with a constant period regardless of the kind of video signal source of the video signal, where the track shift address signal comprising at least a synchronizing code, rotary recording medium type discriminating code, a kick existence instructing code, and a kick direction instructing code, and divided audio signal parts obtained by dividing an audio signal for every field period of the video signal which is reproduced, successively arranged and recorded according to a scanning locus of the pickup reproducing element upon normal reproduction. The rotary recording medium has track parts recorded with the divided audio signal parts on at least one part of a recording surface thereof. The reproducing apparatus comprises an address signal reproducing circuit for reproducing the track shift address signal from within a signal reproduced by a reproducing circuit, and a kick pulse generator responsive to an output signal of the address signal reproducing circuit, for generating a pulse for forcibly shifting the scanning track of the pickup reproducing element.

8 Claims, 51 Drawing Figures

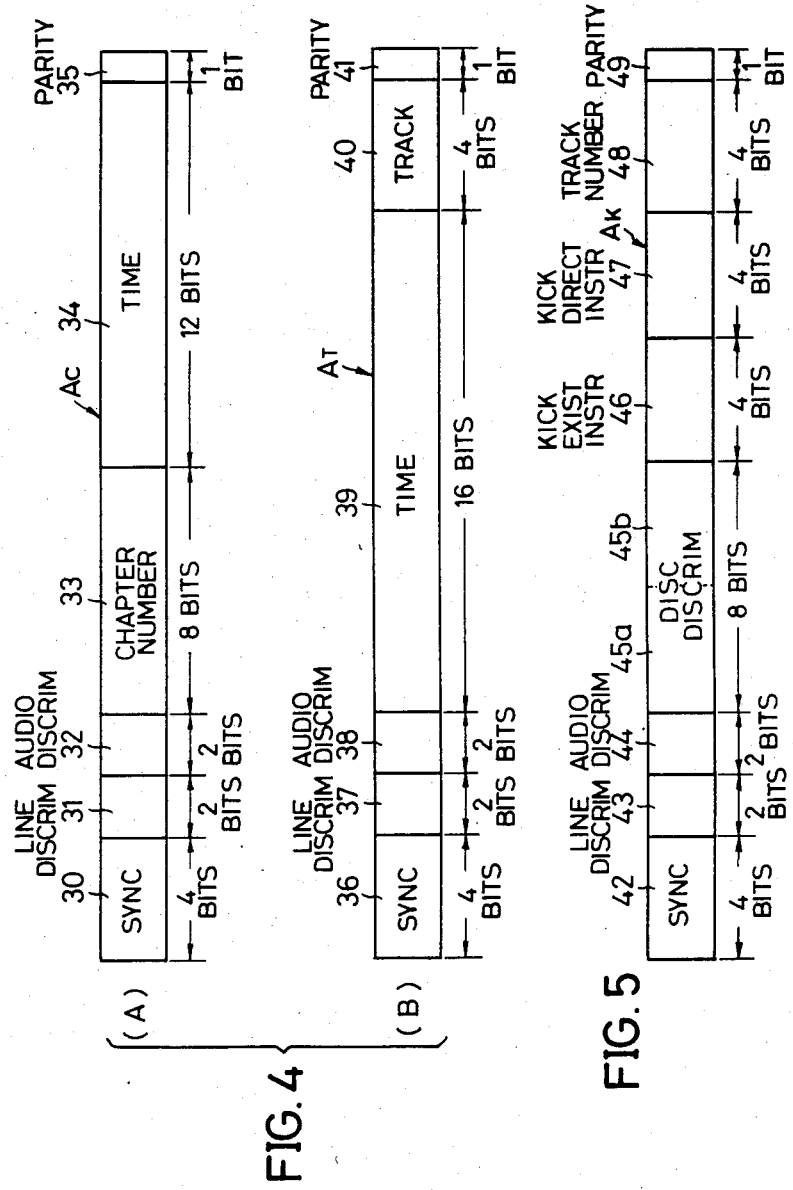

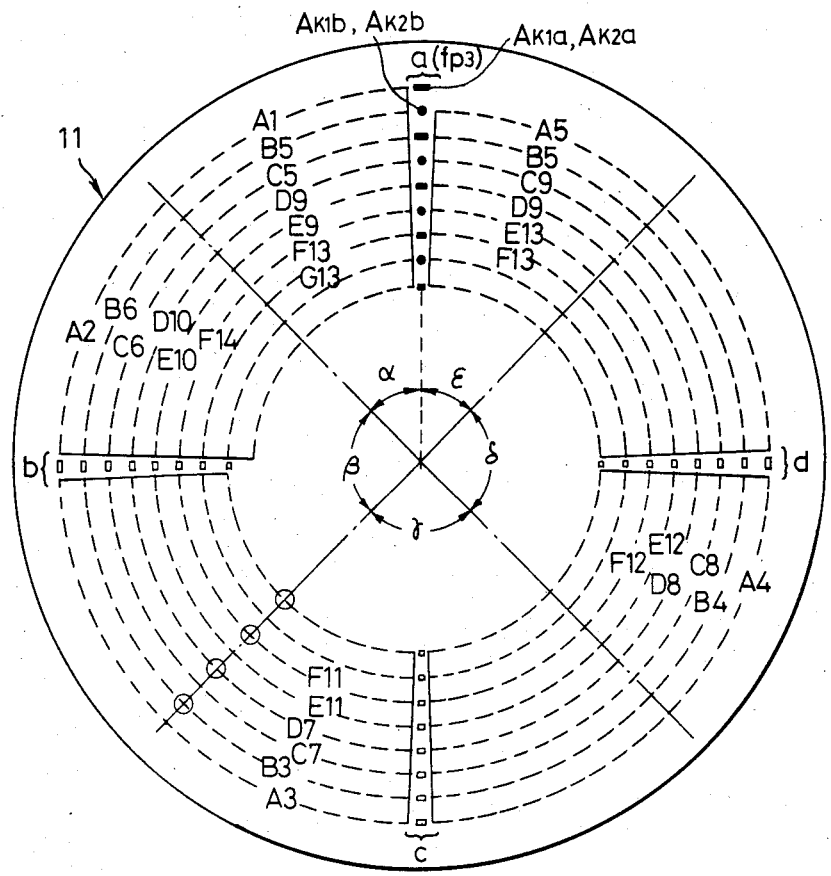

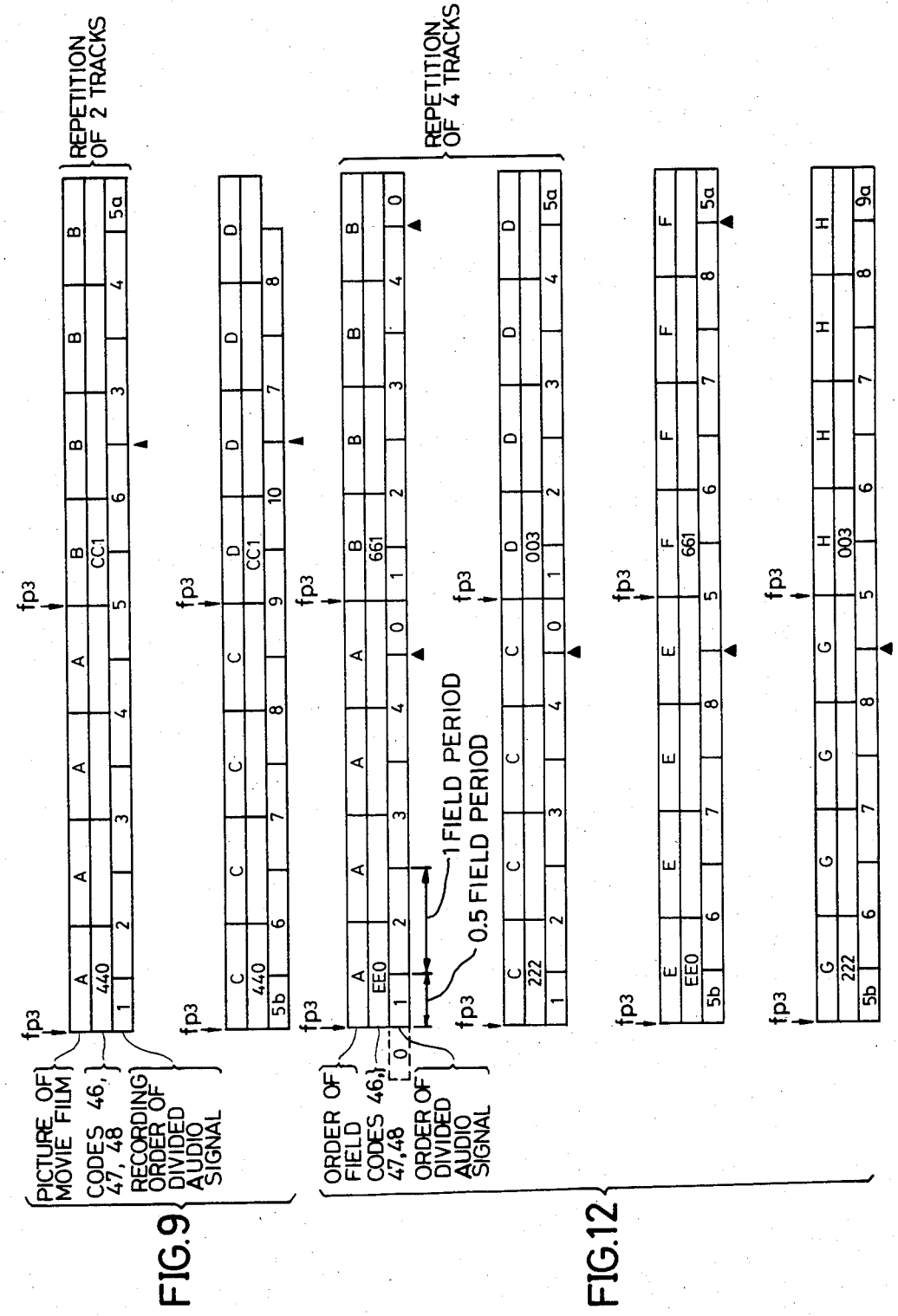

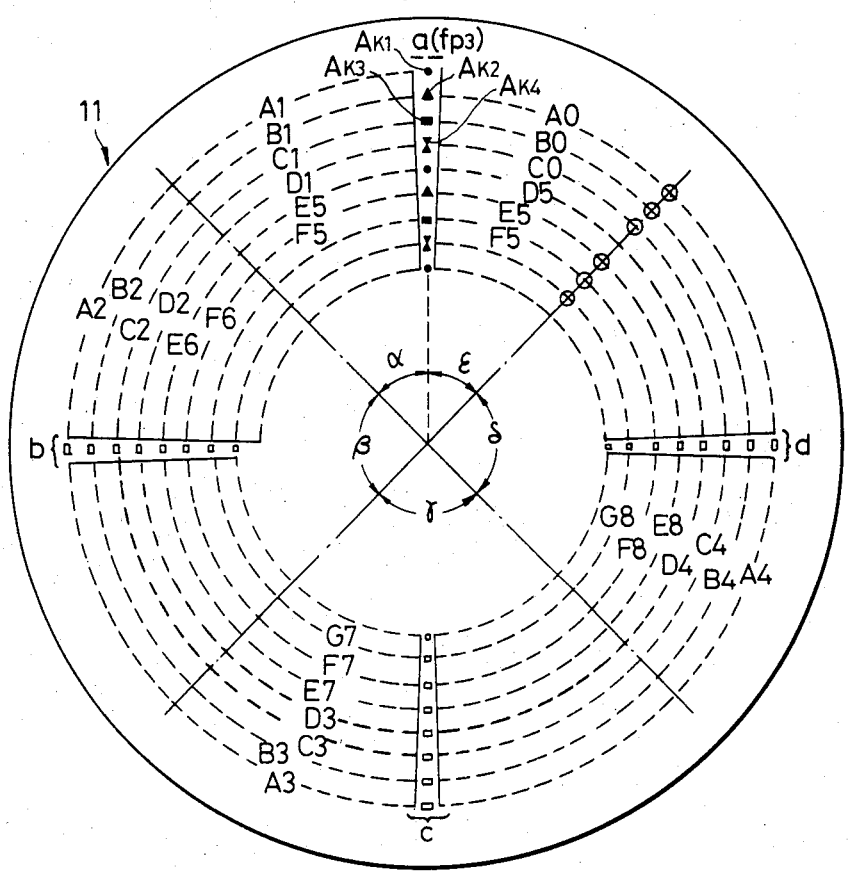

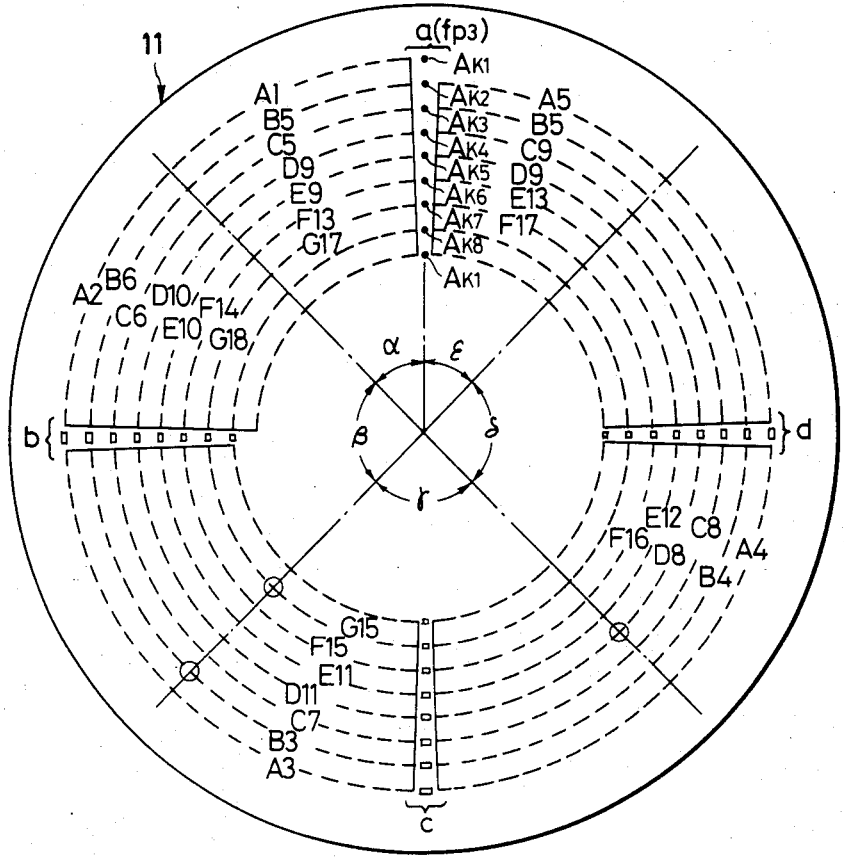

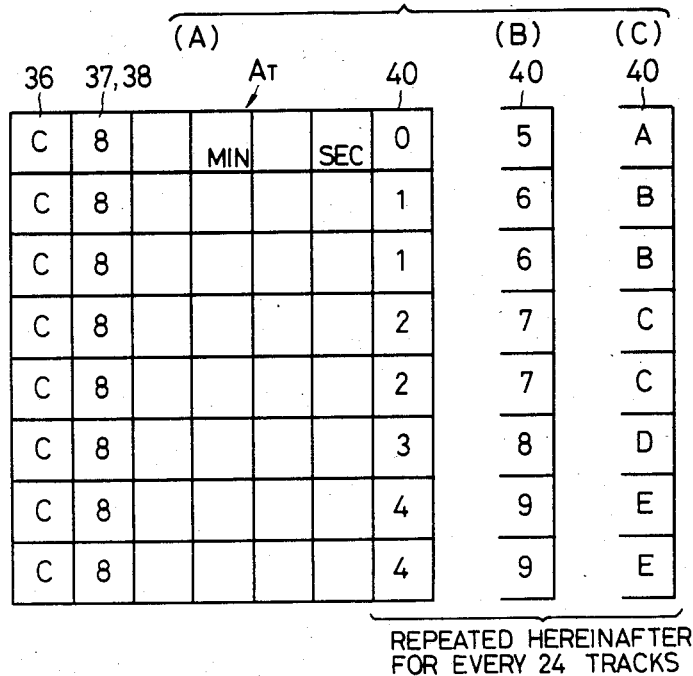
FIG.15
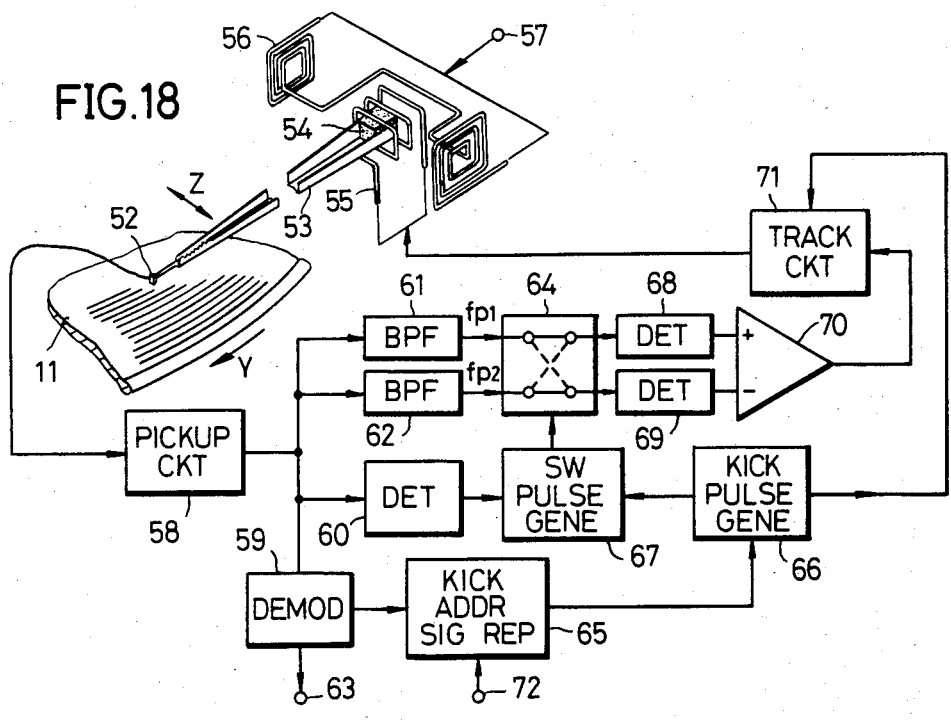

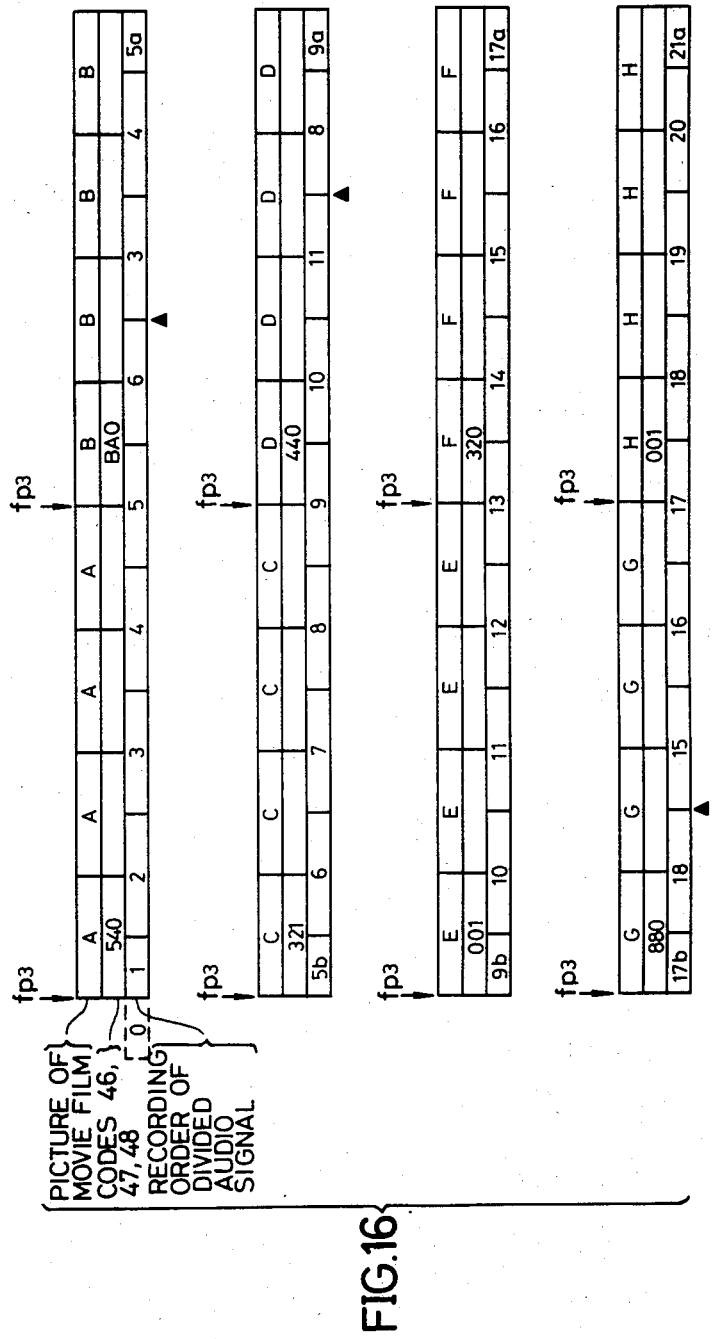

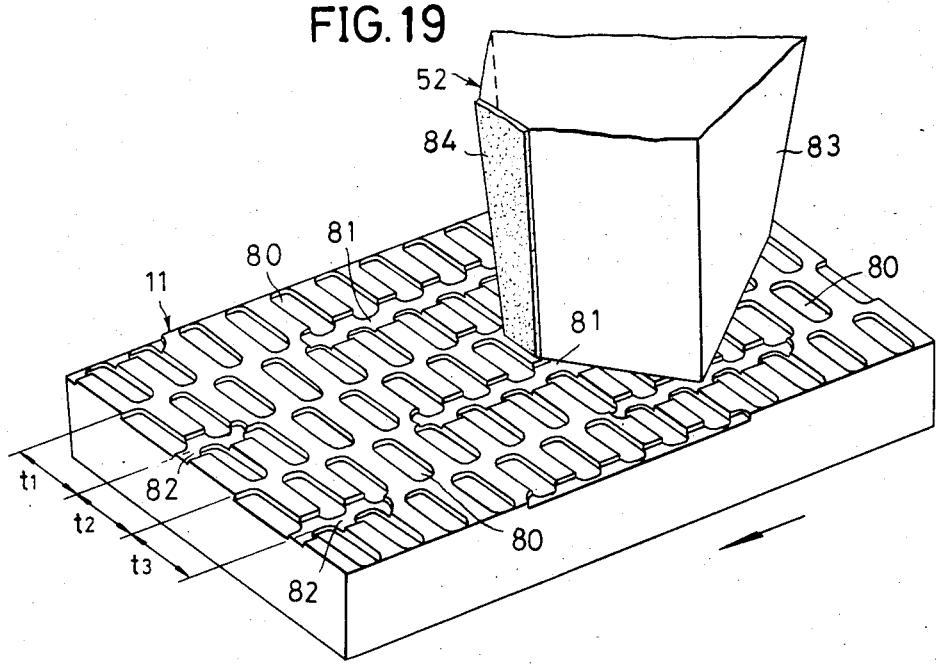

ROTARY RECORDING MEDIUM WHICH IS PLAYABLE IN STILL PICTURE, SLOW-MOTION AND NORMAL REPRODUCTION MODES

This is a continuation of U.S. application Ser. No. 433,872, filed Oct. 13, 1982, and entitled ROTARY RECORDING MEDIUM WHICH IS PLAYABLE IN STILL PICTURE, SLOW-MOTION AND NORMAL REPRODUCTION MODES, abandoned.

BACKGROUND OF THE INVENTION

The present invention generally relates to rotary recording mediums and reproducing apparatuses therefor, and more particularly to a rotary recording medium from which a fine still-picture reproduction and normal reproduction or slow-motion reproduction can be performed selectively, and in which a scanning locus of a pickup reproducing element upon normal reproduction and slow-motion reproduction is unitarily determined so that normal reproduction can be performed accurately with respect to a desired track and slow-motion reproduction can be performed with an arbitrarily set slow-motion reproduction ratio, and a reproducing apparatus for reproducing such a rotary recording medium.

An information signal recording and reproducing system has been previously proposed in which the recording system forms pits in accordance with the information signal to record the information signal along a spiral track on a flat rotary recording medium (hereinafter simply referred to as a disc), without forming a groove therein. In the reproducing system, a reproducing stylus scans by tracing this over along this track to reproduce the recorded information signal in response to variations in the electrostatic capacitance formed between the reproducing stylus and the disc.

In this previously proposed system, since no grooves are provided on the disc for guiding the reproducing stylus, it becomes necessary to record pilot or reference signals on or in the vicinity of a track of the information signal such as a video signal, on the disc. Upon reproduction, the reference signals are reproduced together with the video signal. Tracking control is carried out so that the reproducing stylus accurately scans along the track in response to the reproduced reference signals.

By use of this previously proposed system, there is no possibility whatsoever of the reproducing stylus or the disc being damaged, since the recording track has no groove. The reproducing stylus can scan over the same portion of the track repeatedly many times, whereby a special reproduction such as still-picture reproduction, slow-motion reproduction, or quick-motion reproduction becomes possible.

In the above type of a disc, a standard is set for the above proposed system so that four fields of video signal is recorded for one track turn of the disc. This standard was set in order to increase the recording capacity under the restricting conditions introduced by the practical diameter and rotational speed of the disc, the relative linear speed between the reproducing stylus and the disc for obtaining a fine signal-to-noise (S/N) ratio, and the like.

When a still-picture reproduction is performed with the above disc, the same track turn is reproduced repeatedly. Accordingly, the video signal of four fields is repeatedly reproduced in this case, to perform the still-picture reproduction. However, if the picture content of the video signal which is to be reproduced is a moving picture, the picture recorded in one track turn becomes different in each of the four fields. As a result, the picture obtained by the above still-picture reproduction is not completely still, and the picture appears to undergo a reciprocating movement. Hence, as the movement in the above moving picture becomes faster, the reciprocating movement in the still reproduction picture increases in magnitude. Therefore, there is a disadvantage in that the still reproduction picture does not appear still, and is unpleasant to watch.

On the other hand, another system may be considered wherein the same video information content is repeatedly recorded in four fields in one track turn, and the still-picture reproduction is performed by repeatedly reproducing the same one track turn. In this case, even if the same one track turn is repeatedly reproduced, the still reproduction picture is completely still, because only the same video information content is repeatedly reproduced from the four fields constituting the above one track turn.

If the above disc is repeatedly recorded with the video information of the first field throughout the four fields in the first track turn, repeatedly recorded with the video information of the fifth field throughout the four fields in the succeeding track turn, and thereafter similarly repeatedly recorded with the same video information throughout the four fields in one track turn, the still reproduction picture obtained is completely still. However, because ¾ of the video information is missing, there is a disadvantage in that the movement in the reproduced picture is not smooth and continuous upon normal reproduction.

On the other hand, the disc may be repeatedly recorded with the video information of the first field throughout the four fields in the first track turn, repeatedly recorded with the video information of the second field throughout the four fields in the succeeding track turn, and thereafter similarly repeatedly recorded with video information of each field throughout the four fields in one track turn without missing any video information. When reproducing such a disc, a completely still reproduction picture can be obtained. However, upon normal reproduction, the video information in each field is reproduced four times, and the reproduced picture becomes a slow-motion reproduction picture. Moreover, in discs capable of providing completely still reproduction picture, there is a disadvantage in that a normal audio signal cannot be obtained.

In order to overcome the above described problems, a disc and reproducing apparatus therefor was proposed in a U.S. patent application Ser. No. 363,795, U.S. Pat. No. 4,490,752, filed Mar. 31, 1982 entitled ROTARY RECORDING MEDIUM AND REPRODUCING APPARATUS THEREFOR in which the assignee is the same as that of the present application. In this proposed disc and reproducing apparatus, the disc is repeatedly recorded with a video signal of the same unit for a plurality of field periods in each track turn, and divided audio signal parts obtained by dividing an audio signal in units of field periods of the video signal which is to be reproduced are successively arranged and recorded on a recording track of the video signal according to a scanning locus of a reproducing element on the disc upon normal reproduction during which change of track is performed by forcibly shifting the reproducing element at least once or a plurality of times for two revolution periods of the disc. Thus, the disc reproducing apparatus can obtain a completely still reproduction picture by repeatedly reproducing the video signal of the same unit in one track turn upon still-picture reproduction. Upon normal reproduction, fine normal reproduction picture and normally reproduced audio signal can be obtained, by forcibly shifting the reproducing element to another track at a predetermined position on the disc.

However, the reproducing element may be forcibly shifted to another track at a position than the original shifting position upon normal reproduction. In such a case, the normal reproduction picture and the normally reproduced audio signal are poorly obtained. Furthermore, the video signal recorded on one recording surface of the disc is usually not from the same kind of video signal source. That is, a video signal from another kind of video signal source is often mixed into the video signal from one video signal source. For example, when recording an educational program, the picture corresponding to a part where a teacher and the like comments, is obtained from a reproduced video signal from a magnetic recording and reproducing apparatus. On the other hand, the picture corresponding to a part where the comments are finished and the contents are described concretely, is obtained from a video signal from a movie film, for example.

In this case, the recording method for the video signal which is normally reproduced, differs according to the video signal source. Hence, it becomes necessary to change the scanning locus of the reproducing element according to the kind of video signal source. However, it is difficult to cause the reproducing element to scan over a predetermined scanning locus upon normal reproduction in accordance with the video signal source, without specific information thereof.

The disc may be recorded with a video information on one recording surface, where the video information is time-sequentially composed of two different video information. One video information may be a video information to be reproduced with a picture arbitrarily selected from a still reproduction picture and a normal reproduction picture, and the other video information may be a video information to be reproduced only as a normal reproduction picture. For example, in a program containing a golf tournament, the picture corresponding to the part where the player makes a shot is a video information which can either be obtained as a still reproduction picture or a normal reproduction picture, and accordingly reproduced with the arbitrarily selected picture from the still reproduction picture and the normal production picture. On the other hand, the picture corresponding to a part where the player walks to his golf ball need not be reproduced as a still picture, and thus is a video information which is to be obtained only as a normal reproduction picture. When reproducing such a disc, it is highly desirable to obtain a normal reproduction picture in which the movements are natural. This may be realized if the reproducing apparatus can automatically discriminate the tracks recorded with the video information which is to be obtained as either one of the selected still reproduction picture and the normal reproduction picture, and the tracks recorded with the video information which is to be obtained only as the normal reproduction picture.

In addition, in the case of the slow-motion reproduction, the video information recorded on one track turn is repeatedly reproduced for a number of times in accordance with the slow-motion reproduction ratio, the video information recorded on one succeeding track turn is repeatedly reproduced for the above number of times, and these reproducing operations are successively performed. Hence, the same disadvantages introduced in the case of the above described still-picture reproduction are introduced during the slow-motion reproduction. Further, in the conventional disc and the above proposed disc, the video information (sports program and science experiment program, for example) which is to be reproduced in slow-motion, is recorded throughout a plurality of track turns by normal recording. Accordingly, the recording method is uneconomical because there is a limit to the recording area of the disc.

Moreover, in a case where the video information to be reproduced by normal reproduction and/or the video information to be reproduced by still-picture reproduction and the video information to be reproduced by slow-motion reproduction are respectively recorded time-sequentially on the same recording surface of the disc, it will be useful if the reproducing apparatus can automatically discriminate the reproduction mode of the video information which is recorded in the reproducing track.

SUMMARY OF THE INVENTION

Accordingly, it is a general object of the present invention to provide a novel and useful rotary recording medium and reproducing apparatus therefor, in which the above described problems have been eliminated and the above demands have been satisfied.

Another and more specific object of the present invention is to provide a rotary recording medium in which, a video signal of the same unit is repeatedly recorded in each track turn for a plurality of field periods, a track shift address signal comprising a synchronizing code, a disc type discriminating code, a kick existence instructing code, a kick direction instructing code, and the like, for forcibly shifting a pickup reproducing element to another track in order to obtain a normal reproduction picture or a slow-motion reproduction picture, is recorded within an arbitrary vertical blanking period of the recorded video signal, and each divided audio signal part obtained by dividing an audio signal into field periods of the recorded video signal is successively arranged and recorded on the recording track of the video signal according to a scanning locus of the pickup reproducing element upon normal reproduction, on a track part constituting a portion on the entire recording surface of the rotary recording medium. According to the rotary recording medium of the present invention, a completely still reproduction picture, normal reproduction picture, and normally reproduced audio signal can be obtained selectively. In addition, a slow-motion reproduction picture of a slow-motion reproduction ratio specified by the creator, can be obtained. Moreover, the scanning locus of the pickup reproducing element when obtaining a normal reproduction picture or a slow-motion reproduction picture by forcibly shifting the pickup reproducing element to another track, is unitarily determined. Thus, a normal reproduction picture and normally reproduced audio signal can be obtained accurately, even from a rotary recording medium in which the still picture recording tracks are scattered on the same recording surface of the rotary recording medium.

Still another object of the present invention is to provide a rotary recording medium in which the kick existence instructing code and the kick direction instructing code within the track shift address signal are set by a binary number of N bits equal to N-field periods recorded for each track turn, and the track shift is instructed at N vertical blanking period recording parts for one track turn in correspondence with each bit position, and a reproducing apparatus therefor. According to the presnt invention, the number of times that the track shift signal is recorded and reproduced with respect to one track turn is small, as compared to a rotary recording medium in which a track shift signal is recorded at each position where the track is to be shifted. Hence, an accurate scanning locus can be obtained for the normal reproduction or the slow-motion reproduction, without being affected by dropout.

Another object of the present invention is to provide a rotary recording medium and a reproducing apparatus therefor in which discontinuous points of the audio signal are arranged and recorded at positions different from positions where the pickup reproducing element is forcibly shifted. According to the present invention, normally reproduced audio signal can be obtained without introducing discontinuity in the audio signal at a position where the above track shift is performed upon reproduction. In addition, even if slight deviation is introduced in the forced track shift position, the normally reproduced audio signal can smoothly be obtained.

Still another object of the present invention is to provide a rotary recording medium and a reproducing apparatus therefor in which the track shift address signal for forcibly causing the pickup reproducing element to shift in a reverse direction along the track width direction to repeatedly reproduce the same track turn and instructing the number of times such repetitive reproduction is to be performed, is recorded at at least one position within one track turn. According to the present invention, a slow-motion reproduction can be performed with a slow-motion reproduction ratio arbitrarily set by the creator, and the number of recording tracks can be greatly reduced compared to the conventional rotary recording medium. As a result, the recording density can substantially be increased (for example, 450 tracks were conventionally required for recording a slow-motion reproduction picture which is to be reproduced in 30 seconds, but only one track is required according to the present invention). Furthermore, because the video signal of the same picture or the same field is recorded in one track turn, it is possible to obtain a high quality slow-motion reproduction picture in which the movements are natural.

Other objects and further features of the present invention will be apparent from the following detailed description when read in conjunction with the accompanying drawings.

BRIEF DESCRIPTION OF THE DRAWINGS

FIGS. 4(A) and 4(B) respectively show the construction of a chapter address signal and a time address signal;

FIG. 5 shows an embodiment of a construction of a track shift address signal employed in the present invention;

FIG. 6 shows a track pattern for explaining the recorded signal contents of a first embodiment of a rotary recording medium according to the present invention;

FIGS. 7(A) and 7(B) respectively show values of each code of the track shift address signal in the track pattern shown in FIG. 6, in hexadecimal numbers;

FIGS. 8(A) and 8(B) respectively show values of each code of another track shift address signal in the track pattern shown in FIG. 6, in hexadecimal numbers;

FIG. 9 diagrammatically shows an embodiment of a recording order and a relative recording position relationship between a picture of a movie film, a predetermined code within the track shift address signal, and a divided audio signal part, which are recorded on the disc having the track pattern shown in FIG. 6;

FIG. 10 shows a track pattern for explaining the recording contents of a second embodiment of a rotary recording medium according to the present invention;

FIGS. 11(A) through 11(D) respectively show values of each code of the track shift address signal in the track pattern shown in FIG. 10, in hexadecimal numbers;

FIG. 12 diagrammatically shows an embodiment of a recording order and a relative recording position relationship between a field of a video signal, a predetermined code within the track shift address signal, and a divided audio signal part, which are recorded on the disc having the track pattern shown in FIG. 10;

FIG. 13 shows a track pattern for explaining the recording contents of a third embodiment of a rotary recording medium according to the present invention;

FIGS. 14(A) through 14(H) respectively show values of each code of the track shift address signal in the track pattern shown in FIG. 13, in hexadecimal numbers;

FIGS. 15(A) through 15(C) respectively show values of predetermined codes of the time address signal, in hexadecimal numbers;

FIG. 16 diagrammatically shows an embodiment of a recording order and a relative recording position relationship between a picture of a movie film, a predetermined code within the track shift address signal, and a divided audio signal part, which are recorded on the disc having the track pattern shown in FIG. 13;

FIG. 17 is a diagram for explaining values of each code of another embodiment of a track shift address signal;

FIG. 18 is a systematic block diagram showing a first embodiment of a rotary recording medium reproducing apparatus according to the present invention;

FIG. 19 is a perspective view, in an enlarged scale, showing a part of a rotary recording medium together with a tip end part of a reproducing stylus;

FIGS. 24(A) and 24(B) respectively shown an order of pictures of the reproduced movie film and a reproducing order of the divided audio signal part, when normal reproduction of the rotary recording medium shown in FIG. 6 in a normal manner;

FIGS. 26(A) and 26(B) respectively show an example of a reproducing order of the pictures of the movie film an a reproducing order of the divided audio signal part, for the case shown in FIG. 25;

DETAILED DESCRIPTION

Figure 1:
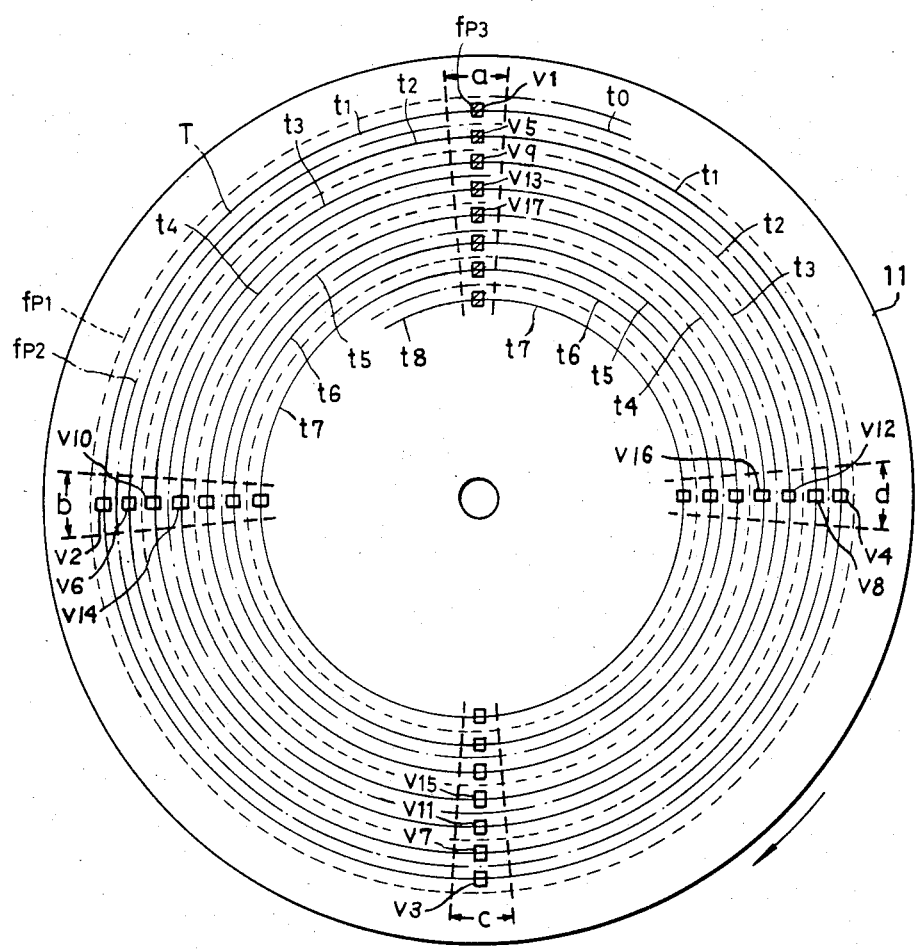
FIG. 1 generally shows a track pattern on a rotary recording medium.

FIG. 1 generally shows a track pattern on a rotary recording medium (disc) 11. A main information signal comprising a video signal and an audio signal is recorded on a spiral track T as a frequency-modulated signal, with pits formed on the disc 11 according to the information contents of the signal. Track turns of a single continuous spiral track T, corresponding to each revolution of the disc 11, are designated by t1, t2, t3, . . . Each track turn is constituted by the formation of pits of a main information signal along a plane track path and has no stylus guide groove formed therein. With respect to one track turn t1, in every horizontal scanning period (1H) at a position corresponding to the horizontal blanking period, pits of a first reference signal fp1 are formed on one lateral side of the track as viewed in the track path direction. Pits of a second reference signal fp2 are formed on the other side of the track.

At an intermediate position between the centerlines of adjacent track turns, only pits of either one kind of the pits of the above reference signals fp1 and fp2 are formed, and moreover, with respect to one track, the sides on which the reference signals fp1 and fp2 are recorded are alternated for every track turn. That is, in FIG. 1, the tracks of the reference signal fp1 are shown by dotted lines, and the tracks of the reference signal fp2 are shown by one-dot chain lines. Reference characters V1, V2, V3, . . . indicate the positions of the vertical synchronizing signal in each field. In addition, a third reference signal fp3 is recorded at the starting end positions V1, V5, V9, . . . of each of the track turns t1, t2, t3, . . . , that is, at positions where the reference signals fp1 and fp2 change over, for a period of 3H, for example.

One revolution period of the disc 11 is equal to a 4-field period of the video signal. The vertical blanking periods are recorded on the tracks t1, t2, t3, . . . within ranges shown by a a, b, c, and d in FIG. 1. Various address signals which will be described hereinafter, are also recorded within the vertical blanking period.

Figure 2:
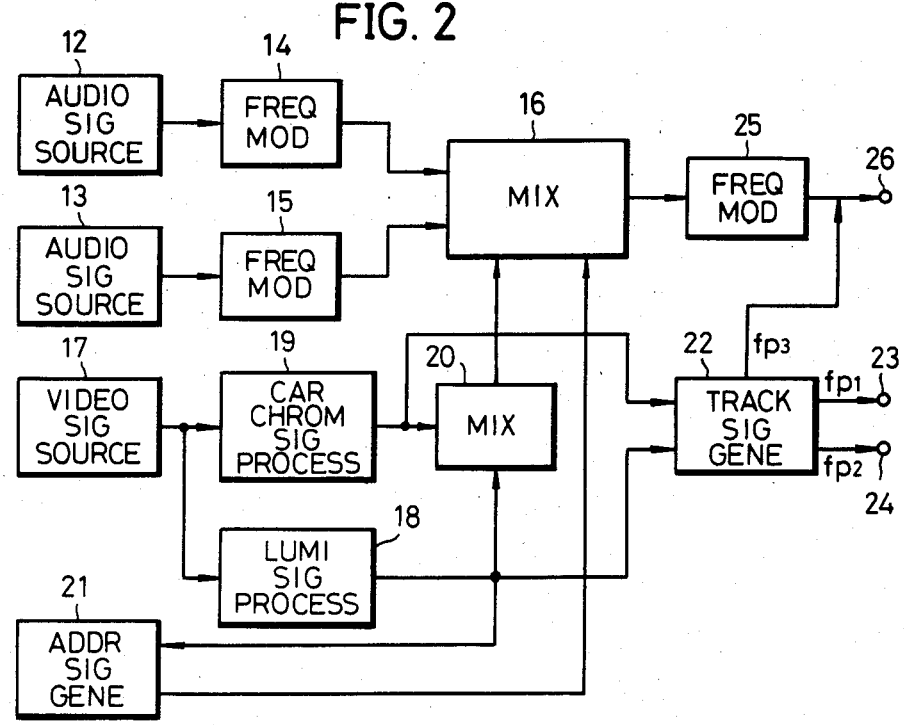
FIG. 2 is a systematic block diagram showing an embodiment of an essential part of a recording system for recording a rotary recording medium according to the present invention.

Next, description will be given with respect to a disc recording system according to the present invention. In FIG. 2, audio signal sources 12 and 13 are tape recorders for successively reproducing divided audio signals recorded on a magnetic tape. As will be described hereinafter, the audio signal to be recorded is re-arranged in a predetermined order for every units of field periods, and time-sequentially composed and recorded onto the magnetic tape. The divided audio signals respectively reproduced by the audio signal sources 12 and 13, are respectively supplied to frequency modulators 14 and 15. The input audio signal to the frequency modulator 14 is modulated into a first audio frequency-modulated wave having a frequency of 3.43 MHz±75 kHz, for example, and supplied to a mixer 16. The input audio signal to the frequency modulator 15 is modulated into an audio frequency-modulated wave having a frequency of 3.73 MHz±75 kHz, for example, and supplied to the mixer 16.

On the other hand, a color video signal source 17 produces a color video signal from a movie film comprising twenty-four or thirty pictures per second, or a color video signal from a magnetic recording and reproducing apparatus (VTR) or a television camera. The color video signal from the color video signal source 17 is supplied to a luminance signal processing circuit 18 wherein the upper limit frequency of the luminance signal is limited. On the other hand, the color video signal from the color video signal source 17 is also supplied to a carrier chrominance signal processing circuit 19 wherein the carrier chrominance signal is separated and converted into a low frequency band. The luminance signal obtained from the luminance signal processing circuit 18 and the low-band-converted carrier chrominance signal obtained from the carrier chrominance signal processing circuit 19 are subjected to band-share multiplexing at a mixer 20, for example, and then supplied to the mixer 16.

An address signal generator 21 produces a chapter address signal, time address signal, and track shift address signal (kick address signal) which will be described hereinafter, in a predetermined order in correspondence with the vertical blanking period of the luminance signal obtained from the luminance signal processing circuit 18. The kick address signal is indicated by $A_{k1}$ and $A_{k2}$ in FIG. 3(D). The chapter address signal, the time address signal, or the kick address signal is supplied to the mixer 16.

Figure 3:
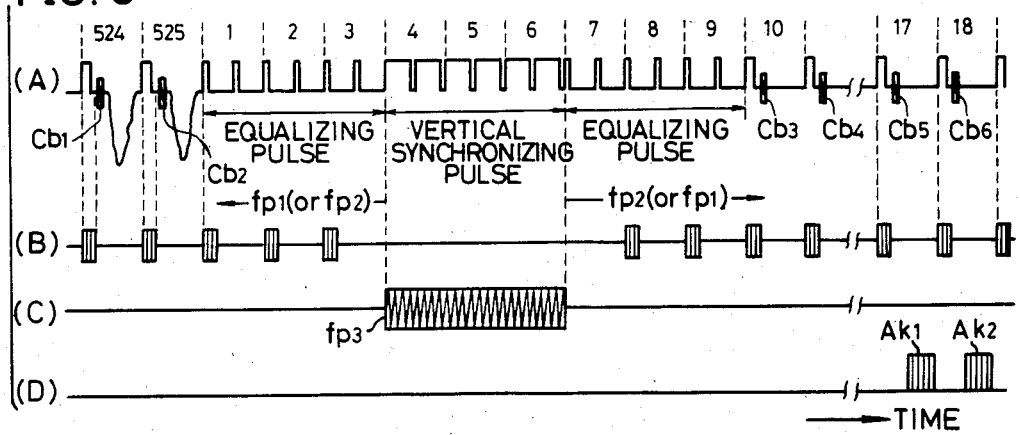
FIGS. 3(A) through 3(D) are graphs respectively showing signal waveforms for explaining the operation of the block system shown in FIG. 2.

The luminance signal from the luminance signal processing circuit 18 and the low-band-converted carrier chrominance signal from the carrier chrominance signal processing circuit 19 are supplied to a tracking signal generator 22. This tracking signal generator 22 generates the above first, second, and third reference signals fp1, fp2, and fp3 having mutually difference frequencies, with frequencies obtained by frequency-dividing the chrominance subcarrier frequency of the low-band-converted carrier chrominance signal, with predetermined timings. As shown in FIG. 3(B), the reference signals fp1 and fp2 are bursted signals produced within the horizontal blanking period of the band-share-multiplexed signal shown in FIG. 3(A) of the luminance signal and the low-band-converted carrier chrominance signal obtained from the mixer 20, and only within a period avoiding the color burst signal so as not to give bad effects to the color burst signal. These reference signals fp1 and fp2 are alternately switched and supplied to output terminals 23 and 24, for every one revolution period of the disc.

The waveform of the output modified color video signal of the mixer 20 which is to be recorded, is shown in FIG. 3(A) for the case where the number of scanning lines is 525. In FIG. 3(A), numbers appearing above the waveform indicate the horizontal scanning line numbers, and reference characters $C_{b1}$ through $C_{b7}$ indicate the color burst signals. In addition, as shown in FIG. 3(C), the third reference signal fp3 is produced for approximately 3 H period corresponding to the vertical synchronizing pulse duration of the modified color video signal shown in FIG. 3(A) which is to be recorded, for one revolution of the disc, and supplied to an output terminal 26.

The above modified color video signal to be recorded, first and second audio frequency-modulated waves occupying empty frequency bands higher than that of the modified color video signal, the chapter address signal, the time address signal, and the kick address signals $A_{k1}$ and $A_{k2}$ generated with timings shown in FIG. 3(D), are respectively mixed and multiplexed at the mixer 16. The mixed multiplexed signal is supplied to a frequency modulator 25 wherein the signal is frequency-modulated. An output of the frequency modulator 25 is produced through the output terminal 26 as a main information signal. The main information signal thus produced through the output terminal 26 is supplied to a recording optical system (not shown), together with the first and second reference signals fp1 and fp2 produced through the output terminals 23 and 24. For example, the carrier deviation frequency band of the luminance signal within the output frequency-modulated wave of the frequency modulator 25 becomes such that the synchronizing signal tip level is 6.1 MHz, the pedestal level is 6.6 MHz, and the white peak is 7.9 MHz.

The above main information signal is applied to a light modulator (not shown), for example, and converted into a modulated light beam by modulating a laser light. The modulated light beam is focused onto a photosensitive agent coated over an original recording disc (not shown) which is synchronously rotated. Intermittent rows of pits are then formed according to the repetition frequency of the main information signal through a known developing process, to form the spiral track T. Accordingly, the video signal and the audio signal are respectively recorded simultaneously onto the track T. The above reference signals fp1 and fp2 are applied to another light modulator (not shown), and converted into a modulated light beam by similarly modulating a laser light. As a result, intermittent rows of pits are formed to form the subtrack simultaneously with the above main track. The disc having the track pattern shown in FIG. 1 is duplicated from the above original recording disc through a known press-forming process.

Next, description will be given with respect to a first embodiment of a disc according to the present invention. In FIG. 6, a spiral dotted line indicates a centerline of a main information signal recording track, and the illustration of the recording tracks of the reference signals fp1 and fp2 are omitted (the illustration of the tracks of the reference signals fp1 and fp2 are similarly omitted in FIGS. 10 and 13 which will be described hereinafter). In FIG. 6 and FIGS. 10 and 13 which will be described hereinafter, the reference characters a, b, c, and d indicate the vertical blanking period recording parts as in the case of FIG. 1. As described above, the third reference signal fp3 and the kick address signals $A_{k1}$ and $A_{k2}$ are respectively subjected to time-division multiplexing and recorded within the vertical blanking period recording part a.

In the first embodiment of the disc according to the present invention shown in FIG. 6, a color video signal obtained from a movie film reproduced at a rate of thirty or twenty-four pictures per second, is subjected to signal processing at the recording system shown in FIG. 2 and recorded thereon. In FIG. 6, reference alphabets indicate one picture of the above movie film, and the order of the reference alphabets indicate the order of the pictures. Accordingly, as shown in FIG. 6, the color video signal of the same picture is repeatedly recorded for a total of four times starting from the vertical blanking period recording part a, for one track turn. That is, the color video signal of one picture is recorded for ¼ revolution period (1-field period) of the disc. Further, the color video signal of each picture of the movie film having twenty-four or thirty pictures per second, is successively recorded for each track without missing the picture information, from the outer periphery to the inner periphery of the disc.

In FIG. 6, the reference numerals added to the reference alphabets indicate the divided order of divided audio signal parts obtained by dividing the audio signal to be recorded for each one or ½-field period. The positions where these reference numeral are shown, indicate the recording range of the divided audio signal part of that divided order. Hence, the normally reproduced audio signal is obtained when the tracks are reproduced in an order in accordance with the order of the above reference numerals. In the embodiment shown in FIG. 6, the audio signal is recorded from the vertical blanking period recording part a throughout a 5.5-field period in a normal manner. Then the audio signal is recorded from, a divided audio signal part "3" which is recorded for a rotational period of an angle $\gamma$ ($\gamma = 90°$ and equal to 1-field period in this case) on the previous track from the position which is 5.5-field period from the above initial recording position, for an 8-field period in a normal manner. Then, the audio signal is recorded from a divided audio signal part "7" which is recorded on the previous track with respect to that position, for an 8-field period in a normal manner. Thereafter, operations are repeated in which a divided audio signal part which is divided for every 1-field period, is normally recorded throughout an 8-field period, and again normally recorded from the divided audio signal part recorded on the previous track for an 8-field period. Accordingly, a discontinuous point of the audio signal exists at a position rotated by an angle $(\alpha+\beta)$ from the vertical blanking period recording part a (a position where 1.5-field period has elapsed, since $\alpha=45°$ and $\beta=90°$ in this case) as indicated by a mark " ⊗ " in FIG. 6, for every second track. Further, in the angles $\alpha$, $\beta$, $\gamma$, $\delta$, and $\epsilon$ shown in FIG. 6, $\alpha=\epsilon=45°$ and $\beta=\gamma=\delta=90°$, for example.

In addition, white rectangular marks within the vertical blanking period recording parts b, c, and d on the track in FIG. 6 indicate that a chapter address signal $A_C$ and a time address signal $A_T$ are respectively recorded. FIG. 4(A) diagrammatically shows the construction of the 29-bit chapter address signal $A_C$ which indicates the order of the recorded programs on the same recording surface of the disc. The chapter address signal $A_C$ comprises a 4-bit synchronizing code 30 indicated by SYNC, a 2-bit line discriminating code 31, a 2-bit audio discriminating code 32, an 8-bit chapter number discriminating code 33, a 12-bit time discriminating code 34, and a 1-bit parity bit 35. In a case where the recorded video signal is of the NTSC system, the chapter address signal $A_C$ is multiplexed with each horizontal scanning period of horizontal scanning line numbers "17" and "280" (that is, with respect to both the odd and even fields, multiplexed with one horizontal scanning period from the eighth incoming horizontal synchronizing signal after the equalizing pulse following the vertical synchronizing pulse) and transmitted.

The synchronizing code 30 is "1100" in binary number, which is "C" in hexadecimal number. The line discriminating code 31 is a code for discriminating the transmission line of the chapter address signal $A_C$. The audio discriminating code 32 is a code for indicating the type of the recorded audio signal (stereo, monaural, bilingual, and the like, for example). Moreover, the chapter number discriminating code 33 is a code for indicating the order of the recorded program, and can indicate a chapter number up to "99" at the maximum, for example. The time discriminating code 34 is a code for indicating the track position from each starting position of the recorded program at each chapter number indicated by the chapter number discriminating code, in terms of seconds in time, and is called the local address. This time discriminating code 34 can indicate up to 4095 ($=2^{12}-1$) seconds at the maximum from zero second.

On the other hand, FIG. 4(B) diagrammatically shows the construction of the 29-bit time address signal $A_T$, which indicates the track position from the starting position of the first recorded program within the program recorded section of the disc, in terms of time. The time address signal $A_T$ comprises a 4-bit synchronizing code 36, a 2-bit line discriminating code 37, a 2-bit audio discriminating code 38, a 16-bit time discriminating code 39, a 4-bit track discriminating code 40, and a 1-bit parity bit 41. The above time address signal $A_T$ is transmitted within one horizontal scanning period succeeding the transmission period of the chapter address signal $A_C$ (at horizontal scanning line numbers "18" and "281"). The line discriminating code 37 indicates the above transmission period of the time address signal $A_T$. The contents of the synchronizing code 36 and the audio discriminating code 38 are respectively the same as the contents of the synchronizing code 30 and the audio discriminating code 32. In addition, the time discriminating code 39 indicates the normal reproduction time of all the recorded programs from the first recorded position, and can indicate up to "59" minutes and "59" seconds at the maximum from zero minute and zero second.

The track discriminating code 40 is a code for discriminating the track numbers of tracks which are reproduced within one second. In a disc wherein the video signal having a field frequency of 60 Hz is to be reproduced together with the audio signal, for example, the reproduction is carried out in a state where the disc is rotated fifteen times during one second. Thus, it becomes necessary to discriminate which track among the fifteen tracks being reproduced within the same one second, is being reproduced, and this is the reason why the above track discriminating code 40 is provided. However, in the disc according to the present invention, because the normal reproduction is performed by shifting the track one or a plurality of times during one revolution of the disc, the manner in which the tracks are numbered is distinctive, as will be described hereinafter. For example, in the case of the disc shown in FIG. 6 where the normal reproduction is performed for every second track, the track discriminating code 40 assumes a value between "0" and "14" for every thirty tracks if the rotational speed of the disc is 900 rpm. If the rotational speed of the disc is 750 rpm, the track discriminating code 40 assumes a value between "0" and "11" for twenty-four tracks, and assumes a value between "0" and "12" in the succeeding twenty-six tracks.

The above described construction of the chapter address signal $A_C$ and the time address signal $A_T$, is the construction previously proposed in an application in which the assignee is the same as the present assignee. These address signals $A_C$ and $A_T$ are recorded within three vertical blanking periods wherein the third reference signal fp3 is not recorded, as indicated by white rectangular marks within vertical blanking period recording parts b, c, and d shown in FIG. 6 among the four vertical blanking period recording parts a, b, c, and d which are recorded for one revolution of the disc.

In FIG. 6, black rectangular and circular marks within the vertical blanking period recording part a indicate that a kick address signal is recorded thereat. A kick address signal $A_K$ has a construction shown in FIG. 5. In the case where the video signal is of the NTSC system, for example, a first kick address signal $A_{K1}$ is transmitted within one horizontal scanning period at the horizontal scanning line number "17" as shown in FIGS. 3(A) and 3(D), within the vertical blanking period in which the third reference signal fp3 is transmitted. A second kick address signal $A_{K2}$ is transmitted within one horizontal scanning period at the horizontal scanning line number "18". However, the contents of the codes slightly differ from the first and second kick address signals $A_{K1}$ and $A_{K2}$ because the kick address signal $A_K$ has the construction shown in FIG. 5.

In FIG. 5, the 29-bit kick address signal $A_K$ comprises a 4-bit synchronizing code 42, a 2-bit line discriminating code 43, a 2-bit audio discriminating code 44, an 8-bit disc discriminating code consisting of an upper 4-bit code 45a and a lower 4-bit code 45b, a 4-bit kick existence instructing code 46, a 4-bit kick direction instructing code 47, a 4-bit track number code 48, and a 1-bit parity bit 49. The synchronizing code 42 assumes the same value as the synchronizing codes 30 and 36 of the above address signals $A_C$ and $A_T$ ("C" in hexadecimal number). In addition, the disc discriminating codes 45a and 45b are codes for discriminating that the disc is a disc having a track pattern shown in FIG. 6, 10, or 13.

In the disc having the track pattern shown in FIG. 6, the kick address signals $A_{K1}$ and $A_{K2}$ are recorded as kick address signals $A_{K1a}$ and $A_{K2a}$, and recorded as kick address signals $A_{K1b}$ and $A_{K2b}$ in the succeeding track. The kick address signals $A_{K1a}$ and $A_{K2a}$ and the kick address signals $A_{K1b}$ and $A_{K1b}$ are thereafter recorded alternately in a similar manner, for each track. That is, in the disc shown in FIG. 6, there are four kinds of kick address signals $A_K$, that is, the kick address signals $A_{K1a}$, $A_{K1b}$, $A_{K2a}$, and $A_{K2b}$, according to the contents of the code. The values of each code of the above kick address signals $A_{K1a}$, $A_{K1b}$, $A_{K2a}$, and $A_{K2b}$ become as shown in FIGS. 7(A) and 7(B) and FIGS. 8(A) and 8(B), and the above disc discriminating codes 45a and 45b respectively assume the value "A" in hexadecimal number.

The kick existence instructing code 46 is a code for instructing whether a forced track shift (hereinafter referred to as a kick) of the reproducing element by one track pitch, for example, is to be performed within the vertical blanking period. When the bit of this kick existence instructing code 46 is "1", it indicates that there is a kick, and "0" indicates that there is no kick. In addition, each of the four bits from the most significant bit (MSB) to the least significant bit (LSB) indicate the existence of a kick at the vertical blanking period recording parts b, c, d, and a in this order.

The kick direction instructing code 47 instructs the kicking direction. Each of the four bits from the the most significant bit (MSB) to the least significant bit (LSB) indicate the kicking direction at the vertical blanking period recording parts b, c, d, and a in this order. When the bit of this kick direction instructing code 47 is "1", it indicates that the kicking direction is the forward direction (towards the inner periphery of the disc), and "0" indicates that the kicking direction is in the reverse direction (outer periphery of the disc). The bit of the kick direction instructing code 47 assumes the value "0" when the corresponding bit in the kick existence instructing code 46 is "0". Further, the track number code 48 assumes a value from "0" to "3" in hexadecimal number, according to the kicking state.

FIGS. 7(A) and 8(A) respectively show values of each code in the kick address signals $A_{K1a}$ and $A_{K2a}$ in hexadecimal number, which are recorded within the vertical blanking period recording part a on the track among the tracks shown in FIG. 6 which is to be reproduced by normal reproduction. The recording positions of the kick address signals $A_{K1a}$ and $A_{K2a}$ are indicated by black rectangular marks in FIG. 6. As shown in FIG. 7(A), in the kick address signal $A_{K1a}$, the value of four bits comprising the line discriminating code 43 and the audio discriminating code 44 is "C", the values of the upper and lower four bits 45a and 45b of the discriminating code respectively are "A", the value of the kick existence instructing code 46 is "4", the value of the kick direction instructing code 47 is "4", and the value of the track number code 48 is "0". Here, the value of the kick existence instructing code 46 is "4" in hexadecimal number, and is "0100" in binary number. That is, because only the second bit from the MSB assumes the value "1", it is instructed that there is to be a kick at only the vertical blanking period recording part c which is the second vertical blanking period recording part from the vertical blanking period recording part wherein the kick address signal $A_{K1a}$ exists. The value of the kick direction instructing code 47 is also "4" in hexadecimal number, and it is instructed that the kicking direction at the vertical blanking period recording part c is in the forward direction.

On the other hand, the kick address signal $A_{K2a}$ only differs from the above kick address signal $A_{K1a}$ in that the kick address signal $A_{K2a}$ is transmitted within one horizontal scanning period succeeding the horizontal scanning period in which the kick address signal $A_{K1a}$ is transmitted, as described above. Accordingly, the value of the four bits comprising the line discriminating code 43 and the audio discriminating code 44 is "8" in hexadecimal as shown in FIG. 8(A), and this is the only difference from the kick address signal $A_{K1a}$ shown in FIG. 7(A) and the values of the other codes are the same as those of the kick address signal $A_{K1a}$.

The kick address signal $A_{K1b}$ shown in FIG. 7(B) and the kick address signal $A_{K2b}$ shown in FIG. 8(B) are respectively and successively recorded within the vertical blanking period recording part a of the track succeeding the track on which the above kick address signals $A_{K1a}$ and $A_{K2a}$ are recorded, that is, at a part indicated by a black circular mark in FIG. 6. The values of the kick existence instructing code 46 and the kick direction instructing code 47 of the kick address signals $A_{K1b}$ and $A_{K2b}$ respectively are "C" in hexadecimal number as shown in FIGS. 7(B) and 8(B), that is, "1100" in decimal number. Accordingly, it is instructed that there is a kick in the forward direction at vertical blanking period recording parts b and c, respectively. As will be described hereinafter, the values of the kick existence instructing code 46 and the kick direction instructing code 47 are such that the scanning locus enables the normal reproduction picture and the normally reproduced audio signal to be obtained with minimum effects, even if the kick address signals $A_{K1a}$ and $A_{K2a}$ on the track which is to be reproduced by normal reproduction could not be reproduced.

FIG. 9 is an embodiment diagrammatically showing the pictures of the movie film, the values of the kick existence instructing code 46, the kick direction instructing code 47, and the track number code 48 of the kick address signals $A_{K1a}$, $A_{K2a}$, $K_{K1b}$, and $A_{K2b}$, and the recording order of the divided audio signal, respectively in correspondence with each other, which are recorded onto the first embodiment of the disc shown in FIG. 9. In FIG. 9, same reference numerals and characters are used as in FIGS. 6, 7, and 8, except for the discontinuous point of the audio signal which is indicated by a mark ⓧ in FIG. 6 but indicated by a black triangular mark in FIG. 9. Further, the reference numerals 5a and 5b shown for indicating the recording order of the divided audio signal respectively indicate the ½-field period of the first half and the ½-field period of the second half of the fifth divided audio signal part. FIG. 9 shows the recording positional relationship between hexadecimal values of the essential parts of the kick address signals $A_{K1a}$, $A_{K2a}$, $A_{K1b}$, and $A_{K2b}$ respectively shown in FIGS. 7(A) and 7(B) and FIGS. 8(A) and 8(B), with respect to the recorded signals on the track pattern shown in FIG. 6.

Next, description will be given with respect to a second embodiment of a disc according to the present invention. In FIG. 10, the reference alphabets indicate the color video signal of 1-field period within the standard system color video signal, and the order of the reference alphabets indicate the order of the field. Accordingly, the color video signal of the same field is repeatedly recorded for a total of four times for one track turn, starting from the vertical blanking period recording part a, as shown in FIG. 10. In addition, the color video signal is successively recorded for each track without missing the picture information, from the outer periphery to the inner periphery of the disc.

In FIG. 10, the numerals added to the reference alphabets indicate the divided order of the divided audio signal parts which are obtained by dividing the audio signal to be recorded for every one or ½-field period. The positions where these numerals are shown, indicate the recording range of these divided audio signal parts of that divided order. Thus, the normally reproduced audio signal is obtained when the tracks are reproduced in the order of these numerals. In this second embodiment shown in FIG. 10, the audio signal is recorded under normal recording throughout a 3.5-field period, starting from the vertical blanking period recording part a. Then, a divided audio signal part "1" of 0.5-field period which is recorded at a rotational period of an angle $\alpha$ ($\alpha = 45°$ and equal to 0.5-field period in this case) on the previous track from the position which is 3.5-field period from the above initial recording position, is repeatedly recorded twice. In addition, the audio signal is thereafter recorded in a normal manner for a 3-field period from a divided audio signal part "2". These operations are repeated for a total of four tracks, and the audio signal is further recorded throughout a 4-field period in a normal manner from a divided audio signal part "5" which is 1-field period after that position. The operation in which the divided audio signal parts divided for every 1-field period is recorded in a normal manner for 4-field period and again recorded for the 4-field period from the divided audio signal part recorded at the previous track, is repeatedly performed for every four tracks. Accordingly, as indicated by the mark ⊗ in FIG. 10, the discontinuous point of the audio signal is at a position rotated by an angle $(\alpha + \beta + \gamma + \delta)$ from the vertical blanking period recording part a (that is, a position 3.5-field period after the vertical blanking period recording part a, because $\alpha = 45°$ and $\beta = \gamma = \delta = 90°$ in this case). The recording pattern of the discontinuous point of the audio signal is such that the discontinuous point exists in every track for three tracks and does not exist in the fourth track, and this recording pattern is repeated. In FIG. 10, the angle $\epsilon = 45°$. Moreover, numerals "0" within the recording part of the angle $\epsilon$, in each of the tracks among the second through fourth tracks from the first track, indicate silent parts.

In addition, in FIG. 10, white rectangular marks within the vertical blanking period recording parts b, c, and d on the track, indicate the parts where the chapter address signal $A_C$ shown in FIG. 4(A) and the time addres signal $A_T$ shown in FIG. 4(B) are recorded. In this second embodiment of the disc, the normal reproduction is performed with respect to every fourth track as will be described hereinafter. Thus, the maximum value of the above time discriminating code 39 becomes "14" minutes and "59" seconds. Furthermore, because the track discriminating code 40 is reproduced under normal reproduction for every fourth track, four adjacent tracks are of the same value, and the value is incremented by one for every four tracks. The track discriminating code 40 assumes values from "0" to "14" for every sixty tracks if the rotational speed of the disc is 900 rpm, and assumes values from "0" to "11" for forty-eight tracks and values from "0" to "12" for the next fifty-two tracks.

In addition, in FIG. 10, the black rectangular marks, black circular marks, and the like within the vertical blanking period recording part a indicate that the kick address signal $A_K$ is recorded at that position. This kick address signal $A_K$ has the construction shown in FIG. 5. According to the contents of the codes which instruct the existence of a forced track shift of the reproducing element, the shifting direction, the shifting position, and the like, there are four kinds of kick address signals $A_{K1}$, $A_{K2}$, $A_{K3}$, and $A_{K4}$ as shown in FIGS. 11(A) through 11(D) which will be described hereinafter. As shown in FIG. 10, these four kinds of kick address signals are repeatedly recorded twice in two horizontal scanning periods within the vertical blanking period during which the third reference signal fp3 is transmitted with a four track period, instead of the above address signals $A_C$ and $A_T$ (for example, when recording the NTSC system color video signal, the four kinds of kick address signals are recorded in two horizontal scanning periods, that is, at the horizontal scanning line numbers "17" and "18" as shown in FIGS. 3(A) and 3(D)).

In FIGS. 11(A) through 11(D), the value of the synchronizing code 42 of each of the address signals $A_{K1}$ through $A_{K4}$ is "C", and is set to the same value as the synchronizing codes 30 and 36 of the above address signals $A_C$ and $A_T$. Further, the value of the four bits comprising the line discriminating code 43 and the audio discriminating code 44 is set to "C" for those recorded within one horizontal scanning period of the above horizontal scanning line number "17", and set to "8" for those recorded within one horizontal scanning period of the above horizontal scanning line number "18".

Next, description will be given with respect to the values of the kick existence instructing code 46 and the kick direction instructing code 47, and the contents of these instructions. First, in the kick address signal $A_{K1}$ shown in FIG. 11(A), the kick address instructing code 46 and the kick direction instructing code 47 both assume the value "E" in hexadecimal number. The value "E" in hexadecimal number is "1110" in binary number. Because the three bits excluding the LSB of the binary number "1110" is "1", it is instructed that there is a kick in the forward direction at each of the vertical blanking period recording parts b, c, and d, excluding the vertical blanking period recording part a. In addition, the values of the above codes 46 and 47 of the kick address signal $A_{K2}$ are both "6" in hexadecimal number as shown in FIG. 11(B), that is, "0110" in binary number. Accordingly, it is instructed that there is a kick in the forward direction at each of the vertical blanking period recording parts c and d.

Similarly, the values of both the above codes 46 and 47 of the kick address signals $A_{K3}$ and $A_{K4}$ respectively are "2" and "0" in hexadecimal number, as shown in FIGS. 11(C) and 11(D). Hence, the kick address signal $A_{K3}$ indicates that there is a kick in the forward direction at the vertical blanking period recording part d, and the kick address signal $A_{K4}$ indicates that there is no kick in any of the vertical blanking period recording parts on that track. The value of each of the codes 46 and 47 of the above kick address signals $A_{K1}$ through $A_{K4}$ are set differently, so as to cause the reproducing element to accurately scan over the track which is to be reproduced under normal reproduction as will be described hereinafter, and also, so that the track which is to be reproduced under normal reproduction can be reproduced rapidly even if a track other than the above track to be reproduced under normal reproduction is reproduced, that is, so that the scanning locus of the reproducing element quickly converges to the scanning locus for the normal reproduction.

FIG. 12 is an embodiment diagrammatically showing the the movie film of each field, the values of the kick existence instructing code 46, the kick direction instructing code 47, and the track number code 48 of the above kick address signal $A_{K1}$, $A_{K2}$, $A_{K3}$, or $A_{K4}$, and the recording order of the divided audio signal, respectively in correspondence with each other, which are recorded onto the second embodiment of the disc shown in FIG. 10. In FIG. 12, same reference numerals and characters are used as in FIGS. 6, 7, and 8, except for the discontinuous point of the audio signal which is indicated by a mark ⊗ in FIG. 10 but indicated by a black triangular mark in FIG. 12. In addition, "0" indicated by a dotted line at the order of the divided audio signal, indicates the silent part of 0.5-field period before the divided audio signal part "1" which is recorded on the first track. This silent part is indicated by the dotted line because this part is not recorded in reality. Moreover, parts "5a" and "5b" respectively indicate the 0.5-field period of the first half and the 0.5-field of the second half of the divided audio signal part "5". Although the codes 46, 47, and 48 of the kick address signals $A_{K1}$ through $A_{K4}$ are shown in FIG. 12 as if these codes are recorded for 1-field period, this is only for convenience' sake, so as to clearly show the recording relationships. Actually, as described above, the above codes 46, 47, and 48 are recorded for two horizontal scanning periods within the vertical blanking period.

Next, description will be given with respect to a third embodiment of the disc according to the present invention. The differing points of the present embodiment as compared to the above first and second embodiments, are the contents of the codes in the kick address signal $A_K$ and the recording arrangement order of the divided audio signal. Furthermore, in the present embodiment explains an example where the color video signal obtained from the movie film having twenty-four pictures per second is reproduced as a color video signal having a field frequency of 60 Hz. The recording position of the kick address signal $A_K$ is the same as in the above first and second embodiments, but in the present embodiment, eight kinds of kick address signals $A_{K1}$ through $A_{K8}$ are recorded on every one track according to the contents of the codes, as will be described hereinafter.

In FIG. 13, the reference alphabets indicate one picture of the movie film having twenty-four pictures per second, and the other of these reference alphabets indicate the order of the pictures. Accordingly, as shown in FIG. 13, the color video signal of the same picture is repeatedly recorded for a total of four times starting from the vertical blanking period recording part a, for one track turn. That is, the color video signal of one picture is recorded for ¼ revolution period (1-field period) of the disc. Further, the color video signal of each picture of the movie film having twenty-four pictures per second, is successively recorded for each track without missing the picture information, from the outer periphery to the inner periphery of the disc.

In FIG. 13, the reference numerals added to the reference alphabets indicate the divided order of divided audio signal parts obtained by dividing the audio signal to be recorded for each 1-field period. The positions where these reference numeral are shown, indicate the recording range of the divided audio signal part of that divided order, except for the divided audio signal part "1" which is recorded for 0.5-field period. Hence, the normally reproduced audio signal is obtained when the tracks are reproduced in an order in accordance with the order of the above reference numerals. In the embodiment shown in FIG. 13, the audio signal is recorded from the vertical blanking period recording part a throughout a 5.5-field period in a normal manner. Then the audio signal is recorded from, a divided audio signal part "3" which is recorded for a rotational period of an angle $\gamma(\gamma=90°$ and equal to 1-field period in this case) on the previous track from the position which is 5.5-field period from the above initial recording position, for a 9-field period in a normal manner. Then, the audio signal is recorded from a divided audio signal part "8" which is recorded on the previous track with respect to that position, for a 11-field period in a normal manner, and further recorded from a divided audio signal part "15" which is recorded on the previous track, for a 12-field period. Thereafter, these operations are repeated. Accordingly, a discontinuous point of the audio signal exists at a position rotated by an angle $(\alpha+\beta)$ from the vertical blanking period recording part a (positions where 1.5-field period and a 2.5-field period have elapsed, since $\alpha=45°$ and $\beta=\gamma=90°$ in this case) as indicated by a mark "⊗" in FIG. 13, for every four tracks. Further, $\delta=90°$ and $\epsilon=45°$, for example.

In addition, white rectangular marks within the vertical blanking period recording parts b, c, and d on the track in FIG. 13 indicate that a chapter address signal $A_C$ and a time address signal $A_T$ are respectively recorded. In this third embodiment shown in FIG. 13, reproduction is carried out according to the known 2-3 pull-down system (or the 3-2 pull-down system). Thus, on one side of the disc on which sixty minutes of recording can be carried out under the conventional normal recording, the maximum value of the above time discriminating code 39 becomes "37" minutes and "30" seconds. Moreover, the track discriminating code 40 becomes as shown in FIGS. 15(A), 15(B), and 15(C).

The values of the synchronizing code 36, the line discriminating code 37, the audio discriminating code 38, and the track number discriminating code 40 of the time address signal $A_T$ which is recorded on eight tracks, are respectively shown in FIG. 15(A) in hexadecimal number. The track number discriminating code 40 is "0" in the first track, "1" in the second track, and thereafter assumes values "1", "2", "2", "3", "4", and "4" in the third through eighth tracks. The track number discriminating code 40 which is recorded in the ninth through sixteenth tracks successively assumes the hexadecimal values shown in FIG. 15(B) from the top in order. Furthermore, the track number discriminating code 40 recorded in the seventeenth through twenty-fourth tracks successively assumes the hexadecimal values shown in FIG. 15(C) from the top in order. The track number discriminating code 40 successively assumes the values shown in FIGS. 15(A) through 15(C) for every twenty-four tracks. During normal reproduction, the tracks are reproduced so that the value of the track number discriminating code 40 is successively incremented by "1" for every one revolution of the disc from "0", to the value "E".

The above chapter address signal $A_C$ and the time address signal $A_T$ are respectively recorded within three vertical blanking period recording parts wherein the third reference signal fp3 is not recorded as indicated by white rectangular marks within the vertical blanking period recording parts b, c, and d in FIG. 13, among the four vertical blanking periods recorded for one revolution of the disc.

In addition, in FIG. 13, black circular marks within the vertical blanking period recording part a indicate that the kick address signal $A_K$ is recorded at that position. The kick address signal $A_K$ has a construction shown in FIG. 5. There are eight kinds of kick address signals $A_{K1}$ through $A_{K8}$ as will be described in conjunction with FIGS. 14(A) through 14(D), according to the contents of codes instructing the existence of the forced track shift of the reproducing element, the shifting direction, the shifting position, and the like. As shown in FIG. 13, these kick address signals $A_{K1}$ through $A_{K8}$ are repeatedly recorded twice instead of the above described address signals $A_C$ and $A_T$, in two horizontal scanning periods within the vertical blanking period during which the third reference signal fp3 is transmitted with a period of eight tracks. That is, because the color video signal from the movie film having twenty-four pictures per second is reproduced under the NTSC system in this case, the kick address signals are recorded in two horizontal scanning periods at the horizontal scanning line numbers "17" and "18" as shown in FIGS. 3(A) and 3(D).

In FIGS. 14(A) through 14(H), the synchronizing code 42 in each of the kick address signals $A_{K1}$ through $A_{K8}$ all assume the value "C", and is set to the same value as the synchronizing codes 30 and 36 of the above address signals $A_C$ and $A_T$. Further, the value of the four bits comprising the line discriminating code 43 and the audio discriminating code 44, are set to the value "C" for those which are recorded within one horizontal scanning period of the horizontal scanning line number "17" and set to the value "8" for those which are recorded within one horizontal scanning period of the horizontal scanning line number "18".

Next, description will be given with respect to the values of the kick existence instructing code 46 and the kick direction instructing code 47, and the contents of the instructions. First, in the kick address signal $A_{K1}$, the kick existence instructing code 46 assumes the value "5" in hexadecimal number, and the kick direction instructing code 47 assumes the value "4" in hexadecimal number, as shown in FIG. 14(A). The above value "5" of the kick existence instructing code 46 in hexadecimal number is "0101" in binary number, and the second bit and the fourth bit (LSB) respectively are "1". Accordingly, it is instructed that there is a kick at both the vertical blanking period recording parts c and a. Moreover, the value "4" of the kick direction instructing code 47 in hexadecimal number is "0100" in binary number. Thus, it is instructed that the kick is in the forward direction at the vertical blanking period recording part c and in the reverse direction at the vertical blanking period recording part a. In addition, in the kick address signal $A_{K2}$ which is recorded on the succeeding track of the above kick address signal $A_{K1}$, the kick existence instructing code 46 assumes the value "B" and the kick direction instructing code 47 assumes the value "A". Hence, it is instructed that there is a kick in the forward direction at the vertical blanking period recording parts b and d, and a kick in the reverse direction at the vertical blanking period recording part a.

As clearly understood from the above description by analogy, the kick address signal $A_{K3}$ shown in FIG. 14(C) and the kick address signal $A_{K6}$ shown in FIG. 14(F) respectively indicate that there is a kick in the forward direction at the vertical blanking period recording parts d and a kick in the reverse direction at the vertical blanking period recording part a. The kick address signal $A_{K4}$ shown in FIG. 14(D) indicates that there is a kick in the forward direction at the vertical blanking period recording part c. The kick address signals $A_{K5}$ and $A_{K8}$ respectively shown in FIGS. 14(E) and 14(H) indicate that there is no kick throughout one revolution of the disc. Furthermore, the kick address signal $A_{K7}$ shown in FIG. 14(G) indicates that there is a kick in the forward direction at the vertical blanking period recording part b. The value of each of the codes 46 and 47 of the above kick address signals $A_{K1}$ through $A_{K8}$ are set as described above, so as to cause the reproducing element to accurately scan over the track which is to be reproduced under normal reproduction as will be described hereinafter, and also, so that the track which is to be reproduced under normal reproduction can be reproduced rapidly even if a track other than the above track to be reproduced under normal reproduction is reproduced, that is, so that the scanning locus of the reproducing element quickly converges to the scanning locus for the normal reproduction.

FIG. 16 is an embodiment diagrammatically showing the the movie film of each picture, the values of the kick existence instructing code 46, the kick direction instructing code 47, and the track number code 48 of the above kick address signal $A_{K1}$ and $A_{K8}$, and the recording order of the divided audio signal, respectively in correspondence with each other, which are recorded onto the disc according to the present invention. In FIG. 16, same reference numerals and characters are used as in FIG. 13, except for the discontinuous point of the audio signal which is indicated by a mark ⊗ in FIG. 13 but indicated by a black triangular mark in FIG. 16. In addition, "0" indicated by a dotted line at the order of the divided audio, signal, indicates the silent part of 0.5-field period before the divided audio signal part "1" which is recorded on the first track. This silent part is indicated by the dotted line because this part is not recorded in reality. Moreover, parts indicated with subscripts "a" and "b" respectively indicate the 0.5-field period of the first half and the 0.5-field of the second half of that divided audio signal part. Although the codes 46, 47, and 48 of the kick address signals $A_{K1}$ through $A_{K8}$ are shown in FIG. 16 as if these codes are recorded for 1-field period, this is only for convenience' sake, so as to clearly show the recording relationships. Actually, as described above, the above codes 46, 47, and 48 are recorded for two horizontal scanning periods within the vertical blanking period.

Next, description will be given with respect to a fourth embodiment of the disc according to the present invention. In the present embodiment, the recording methods of the color video signal and the audio signal are the same as those employed in the above described first through third embodiments of the invention. In addition, the kick address signal $A_K$ is recorded within the vertical blanking period as in the above first through third embodiments. However, the present embodiment differ from the first through third embodiments in the aspect that the contents of the codes of the kick address signal $A_K$ are selected as shown in FIG. 17.

That is, the values in each of the codes 42, 43, 44, 45a, and 45b are the same as in the kick address signal shown in FIGS. 7(A), 7(B), 11, or 14(A) through 14(H). However, as shown in FIG. 17, the kick existence instructing code 46 is "1" in hexadecimal number, and the kick direction instructing code 47 is "0" in hexadecimal code. This means that there is a track shift of one track pitch in the reverse direction within the vertical blanking period recording part a. The slow-motion reproduction ratio is specified by a value "X" of the track number code 48. Description will now be given with respect to the selecting method of the above value "X". First, the slow-motion reproduction is specified by the value "X", when the value of the MSB among the four bits is set to "1". If the binary coded decimal value indicated by binary values "$X_1$", "$X_2$", and "$X_3$" of the second, third, and fourth bits is designated by L, the number of times the track is reproduced reproducing number) is specified by $2^L$. If the relationship between the reproducing number of the same track by a first selecting method of the above value "X" and the above values "$X_1$", "$X_2$", and "$X_3$" is summed up, the following Table 1 is obtained.

TABLE 1

| X | | | | Reproducing Number | Slow-Motion Ratio |
|---|---|---|---|---|---|
| 1 | $X_1$ | $X_2$ | $X_3$ | | |
| 1 | 0 | 0 | 0 | Not Defined | Not Defined |
| 1 | 0 | 0 | 1 | 2 | 1/2 |
| 1 | 0 | 1 | 0 | 4 | 1/4 |
| 1 | 0 | 1 | 1 | 8 | 1/8 |
| 1 | 1 | 0 | 0 | 16 | 1/16 |
| 1 | 1 | 0 | 1 | 32 | 1/32 |
| 1 | 1 | 1 | 0 | 64 | 1/64 |
| 1 | 1 | 1 | 1 | 128 | 1/128 |

According to a second selecting method of the value "X", the number of times the track shift is performed by one track pitch in the reverse direction (towards the outer periphery of the disc) within the vertical blanking period recording part a wherein the third reference signal fp3 exists (that is, the number of times the reproducing element is kicked back), is described by the binary coded decimal value, by four bits of the track number code 48. The relationship between the value "X", the kick-back number, and the slow-motion ratio according to this second method is shown in the following Table 2.

TABLE 2

| X | | | | Kick-Back Number | Slow-Motion Ratio |
|---|---|---|---|---|---|
| 0 | 0 | 0 | 0 | 0 | Not Defined |
| 0 | 0 | 0 | 1 | 1 | 1/2 |
| 0 | 0 | 1 | 0 | 2 | 1/3 |
| 0 | 0 | 1 | 1 | 3 | 1/4 |
| 0 | 1 | 0 | 0 | 4 | 1/5 |
| 0 | 1 | 0 | 1 | 5 | 1/6 |
| 0 | 1 | 1 | 0 | 6 | 1/7 |
| . | . | . | . | . | . |
| . | . | . | . | . | . |
| . | . | . | . | . | . |
| 1 | 1 | 0 | 1 | 13 | 1/14 |
| 1 | 1 | 1 | 0 | 14 | 1/15 |
| 1 | 1 | 1 | 1 | 15 | 1/16 |

In the present embodiment of the disc according to the present invention, the still-picture reproduction and the slow-motion reproduction are selectively performed.

Next, description will be given with respect to a first embodiment of a disc reproducing apparatus according to the present invention, in conjunction with FIGS. 18 and 19. In FIG. 18, the disc 11 is placed onto a turntable (not shown) and periodically rotated at a high speed along the direction of an arrow Y together with the turntable, by a motor (not shown). The rotational speed of the disc 11 is set to 750 rpm in the case where the track pattern in on the disc is the first embodiment shown in FIG. 6 wherein the color video signal obtained from the movie film having twenty-four pictures per second is recorded, and is set to 900 rpm in the case where the color video signal obtained from the movie film having thirty pictures per second is recorded. On the other hand, if the second embodiment of the disc shown in FIG. 10 is used, the rotational speed of the disc 11 is set to 750 rpm in the case where the PAL system or SECAM system color video signal is recorded, and is set to 900 rpm in the case where the NTSC system color video signal is recorded. Furthermore, if the third embodiment of the disc shown in FIG. 13 is used, the rotational speed of the disc 11 is set to 900 rpm. As the disc 11 is rotated, a reproducing stylus 52 slides and scans over the surface of the disc 11.

The reproducing stylus 52 is fixed to an end of a cantilever 53, and a permanent magnet 54 is fixed to the base at the other end of the cantilever 53. The part where the permanent magnet 54 of the cantilever 53 is fixed, is surrounded by a jitter compensating coil 56 and a tracking coil 55 fixed to the reproducing apparatus. At the jitter compensating coil 56, right and left coil parts are respectively wound in the same phase. Accordingly, an attractive force or a repulsive force simultaneously acts on the permanent magnet 54 from these coil parts, according to the polarity of a jitter compensation signal obtained through an input terminal 57. As a result, the cantilever 53 moves linearly along the tangential direction of the track on the disc 11, and jitter introduced due to eccentricity and surface irregularity or inconsistency of the disc 11 is compensated. In addition, the tracking coil 55 generates a magnetic field along a direction perpendicular with respect to the magnetic field of the permanent magnet 54, and causes the cantilever 53 to move in one direction along directions of an arrow Z (track with direction) according to the polarity of a tracking error signal obtained from a tracking circuit 71, by a moving quantity in accordance with the magnitude of the tracking error signal.

A main information signal comprising a video signal and an audio signal is recorded on a spiral track as a frequency-modulated signal, with pits formed on the disc 11 according to the information contents of the signal. One part of this track is shown in an enlarged scale in FIG. 19. In FIG. 19, track turns of a single continuous spiral track, corresponding to each revolution of the disc 11, are designated by t1, t2, t3, .... Each track turn is constituted by the formation of pits 80 of a main information signal along a plane track path and has no stylus guide groove formed therein. With respect to one track turn t1, in every horizontal scanning period (1H) at a position corresponding to the horizontal blanking period, pits 81 of the first reference signal fp1 are formed on one lateral side of the track as viewed in the track path direction. Pits of the second reference signal fp2 are formed on the other side of the track.

At an intermediate position between the centerlines of adjacent tracks, only pits of either one kind of the pits 81 and 82 of the above reference signals fp1 and fp2 are formed, and moreover, with respect to one track, the sides on which the pits 81 and 82 are formed are alternated for every track turn. That is, if the pits 81 and 82 are respectively formed on the right and left sides of one track turn, for example, the pits 82 and 81 will respectively be formed on the right and left sides of each of the adjacent track turns.

The tip end of the reproducing stylus 52 has a shape shown in FIG. 19. The reproducing stylus 52 is constituted by a stylus structure 83 having a disc tracing surface which has a width greater than the track width, and an electrode 84 fixed to the rear face of the stylus structure 83. As the reproducing stylus 52 traces along a track ion the disc 11 rotating in a direction indicated by an arrow, the main information signal recorded thereon by the formation of pits is reproduced as variations in the electrostatic capcitance between the surface of the disc 11 and the electrode 84 of the reproducing stylus 52.

A pickup circuit 58 comprises a resonant circuit which is varied of the resonance frequency according to the variation in the electrostatic capacitance between the electrode 84 and the disc 11 due to the intermittent rows of pits, a circuit for applying a constant frequency signal to the resonant circuit, a circuit for detecting the amplitude of the high-frequency signal obtained from the resonant circuit, and a circuit for preamplifying the above detected high-frequency signal (reproduced signal). The high-frequency reproduced signal obtained from the pickup circuit 58 is supplied to a demodulator 59 wherein the main information signal (the video signal and the audio signal in this case) of the main track is demodulated. The demodulated signal is produced through an output terminal 63. On the other hand, a part of the high-frequency reproduced signal from the pickup circuit 58 is supplied to bandpass amplifiers 61 and 62, and a detector 60. Here, the bandpass amplifiers 61 and 62 respectively have characteristics to frequency-select and amplify only the respective frequencies of the reference signals fp1 and fp2. The reference signals fp1 and fp2 respectively obtained from the bandpass amplifiers 61 and 62 are supplied to first and second input terminals of a gate switching circuit 64. The detector 60 frequency-selects the reference signal fp3 and generates an envelope detection output. The detector 60 self-generates the reference signal fp3 even if the reference signal fp3 is not reproduced due to dropout and the like, and the envelope detection output signal is supplied to a switching signal generator 67.

The gate switching circuit 64 is switched by a switching signal from the switching signal generator 67. For example, during the high-level period of the switching signal, the respective output signals of the bandpass amplifiers 61 and 62 are independently applied to respective input terminals of detectors 68 and 69. On the other hand, during the low-level period of the switching signal, the respective output signals of the bandpass amplifiers 61 and 62 are independently applied to respective input terminals of the detectors 69 and 68.

The polarity of the switching signal from the switching signal generator 67 is reversed with an incoming detection signal from the detector 60 or a kick pulse (excluding an incoming kick pulse during reproduction of the reference signal fp3) from a kick pulse generator 66 which will be described hereinafter. An envelope detection output of a reference signal reproduced from a track on the outer side of the track which is to be reproduced, is thus obtained from the detector 68. Moreover, an envelope detection output of a reference signal reproduced from a track on the inner side of the track which is to be reproduced, is obtained from the detector 69. These envelope detection outputs of the detectors 68 and 69 are respectively supplied to a differential amplifier 70 provided in a succeeding stage. A tracking error signal having a polarity in accordance with the direction of the tracking error and having a level (magnitude) in accordance with the tracking error quantity, is obtained from the differential amplifier 70. This tracking error signal is supplied to the tracking coil 55 through the tracking circuit 71, to control the tracking coil 55. Accordingly, the reproducing stylus 52 is moved along the radial direction of the disc 11 with appropriate direction and quantity, so that the tracking error becomes zero and the reproducing stylus 52 accurately scans over the spiral track T on the disc 11.

On the other hand, the video signal within the main information signal which is demodulated and obtained from a demodulator 59, is supplied to a kick address signal reproducing circuit 65. The kick address signal reproducing circuit 65 detects and reproduces the above kick address signal, and discriminates the existence of the kick and the kicking direction from the values of the kick existence instructing code 46 and the kick direction instructing code 47. If the existence of the kick is detected, the kick address signal reproducing circuit 65 produces a detection signal having a polarity in accordance with the kicking direction, for example.

Figure 21:
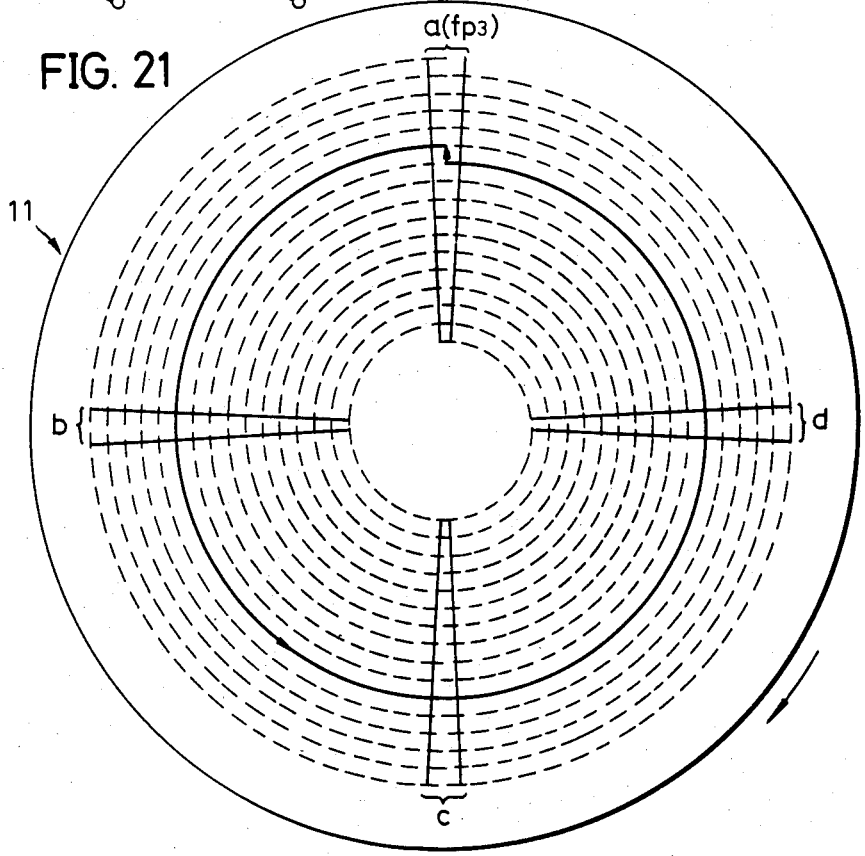
FIG. 21 is a diagram showing an example of a scanning locus of the reproducing stylus when still-picture reproduction is performed with respect to a rotary recording medium shown in FIG. 6, 10, or 13.

Next, description will be given with respect to the still-picture reproduction mode and normal reproduction mode of the disc. First, during the still-picture reproduction mode, a still-picture reproduction mode signal is supplied to the kick address signal reproducing circuit 65 through a terminal 72, to put the kick address signal reproducing circuit 65 is a non-operational state. The kick pulse generator 66 accordingly generates a kick pulse for forcibly shifting the reproducing stylus 52 by one track pitch in the reverse direction (towards the outer periphery of the disc) for every one revolution of the disc 11. This kick pulse thus generated, is applied to the tracking coil 55 through the tracking circuit 71, to apply an urging force on the reproducing stylus 52 so that the reproducing stylus 52 is shifted towards the outer periphery every time the third reference signal fp3 is reproduced. At the same time, by holding the polarity of the output switching pulse of the switching pulse generator 67, the reproducing stylus 52 is kicked by one track pitch within the vertical blanking period recording part a as in the conventional case, to repeatedly reproduce the same track. In FIG. 21, a solid line indicates the scanning locus of the reproducing stylus 52 upon still-picture reproduction of the disc 11. In the track which is formed for one revolution of the disc from the recording position of the third reference signal fp3, among the track parts of the disc 11 having the track pattern shown in FIG. 6, 10 or 13 recorded with the color video signal, the video signal of the same field or the same picture is repeatedly recorded. Hence, a completely still reproduction picture can be obtained from the video signal of the same field or the same picture, by repeatedly reproducing the same track.

Normally, during the above still-picture reproduction, the reproduced audio signal is muted and is not heard. In addition, the feeding of the pickup device including the reproducing stylus 52 is stopped.

Next, description will be given with respect to the operation upon normal reproduction of the disc according to the present invention. During the normal reproduction, a normal reproduction mode signal is supplied to the kick address signal reproducing circuit 65. A kick control signal obtained from the kick address signal reproducing circuit 65 be decoding and reproducing the codes, is applied to the kick pulse generator 66.

When reproducing a disc having the track pattern shown in FIG. 6, the kick pulse generator 66 generates a kick pulse according to a signal obtained by decoding the kick existing instructing code 46 and the kick direction instructing code 47 of the kick address signals $A_{K1a}$ and $A_{K2a}$. In this case, the reproducing stylus 52 moves along a scanning locus indicated by a solid line in FIG. 22. That is, the reproducing stylus 52 reproduces every second tracks to reproduce the tracks on which the kick address signal $A_{K1a}$ and $A_{K2a}$ are recorded.

Figure 22:
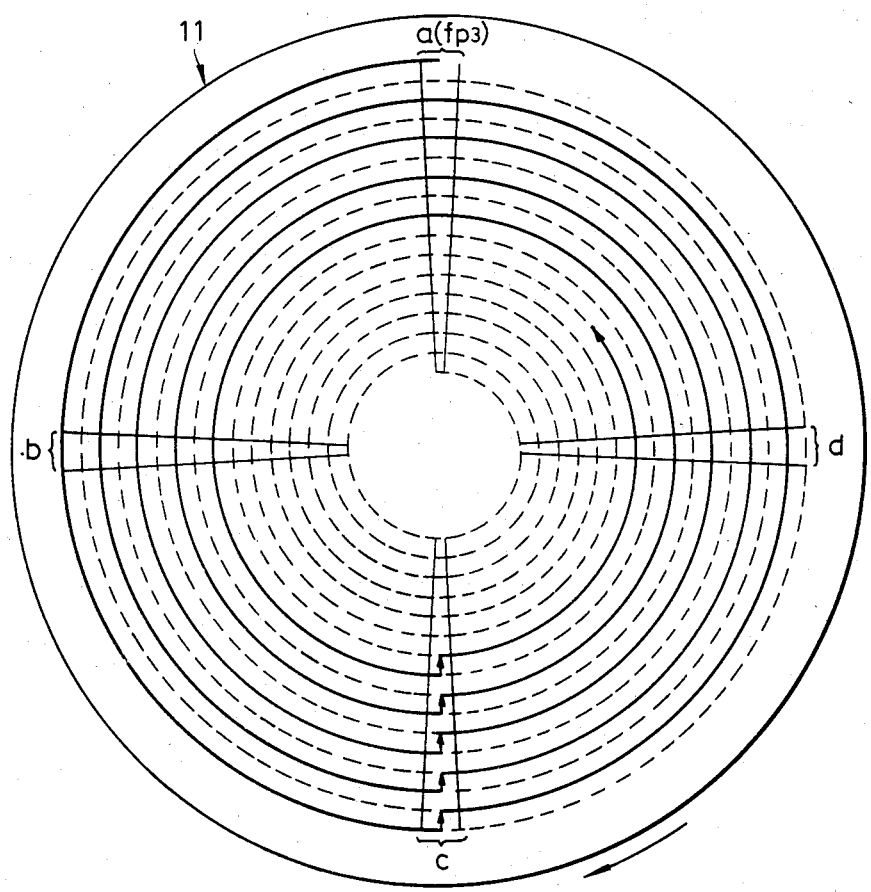
FIG. 22 is a diagram showing an example of a scanning locus of the reproducing stylus when obtaining a normal reproduction picture and normally reproduced audio signal from the rotary recording medium shown in FIG. 6.
Figures 23, 24:
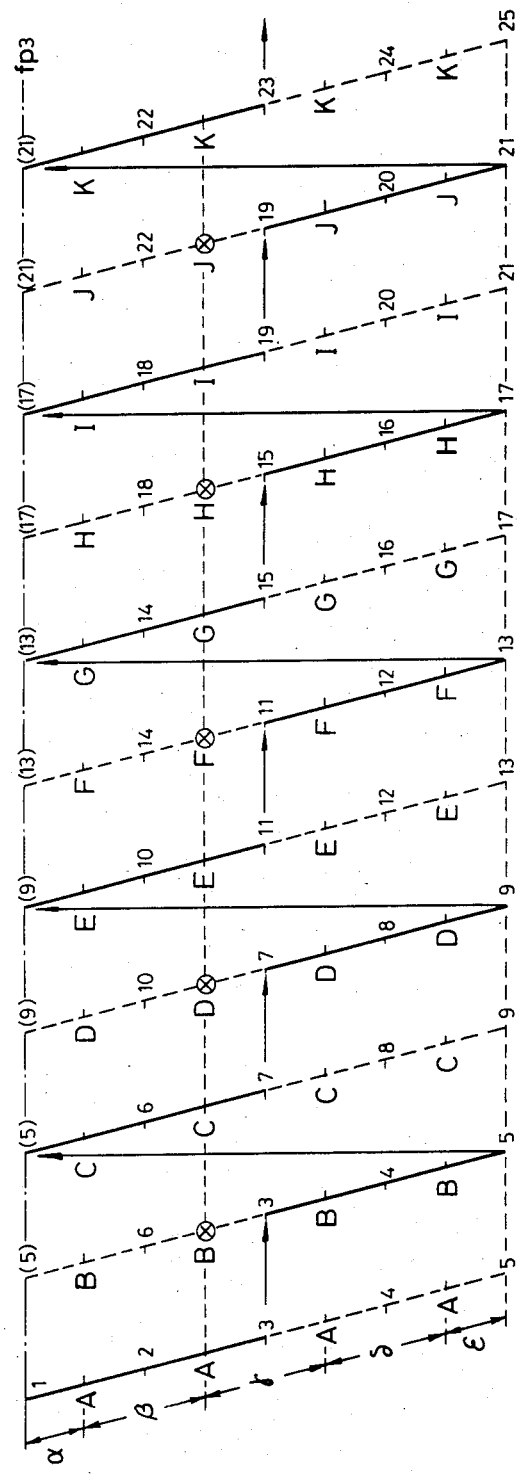
FIG. 23 diagrammatically shows an example of a relationship between at track scanning locus and a signal recorded on the track, when normal reproduction is performed with respect to the rotary recording medium shown in FIG. 6 in a normal manner.

FIGS. 23, 24(A), and 24(B) show the relationship between the scanning locus of the reproducing stylus 52, the picture of the movie film which is reproduced, and the divided audio signal part. In FIG. 23, those parts which are the same as those corresponding parts in FIG. 6 are designated by the same reference numerals. In FIG. 23 and FIGS. 25, 28, 29, and 31 which will be described hereinafter, one rightwardly sloping line indicates one track. The recording position of the picture or field of the movie film of the recorded color video signal is indicated at the left of the sloping line. Numerals at the right of the sloping line indicates the recording position of the recorded divided audio signal part. Further, solid parts of the above sloping line indicate the track parts which are scanned and reproduced. As clearly seen from FIGS. 22 and 23, the reproducing stylus 52 reproduces the pictures of the recorded movie film for every 1-field period, in an order A→A→B→B→C→C→.... As a result, the color video signal of the same picture is repeatedly reproduced for 2-field period, and a normal reproduction picture in accordance with the known 2-2 pull-down system is obtained. FIG. 24(A) shows the reproducing order of the pictures of the recorded movie film upon normal reproduction.

On the other hand, with respect to the audio signal, the divided audio signal parts are successively reproduced in the divided order as clearly seen from FIG. 23. Thus, the audio signal is reproduced in a normal manner. Moreover, in this case, the kicking position of the reproducing stylus 52 is within the vertical blanking period recording part c, at a position avoiding the discontinuous point of the audio signal indicated by the mark ⓧ in FIG. 23. Therefore, even if the kick position is deviated for some reason, the reproduced sound does not become discontinuous, and the audio signal is reproduced continuously in a normal manner. FIG. 24(B) shows the reproducing order of the order divided audio signal upon normal reproduction, and arrows indicate the kicking positions.

Figures 25, 26:
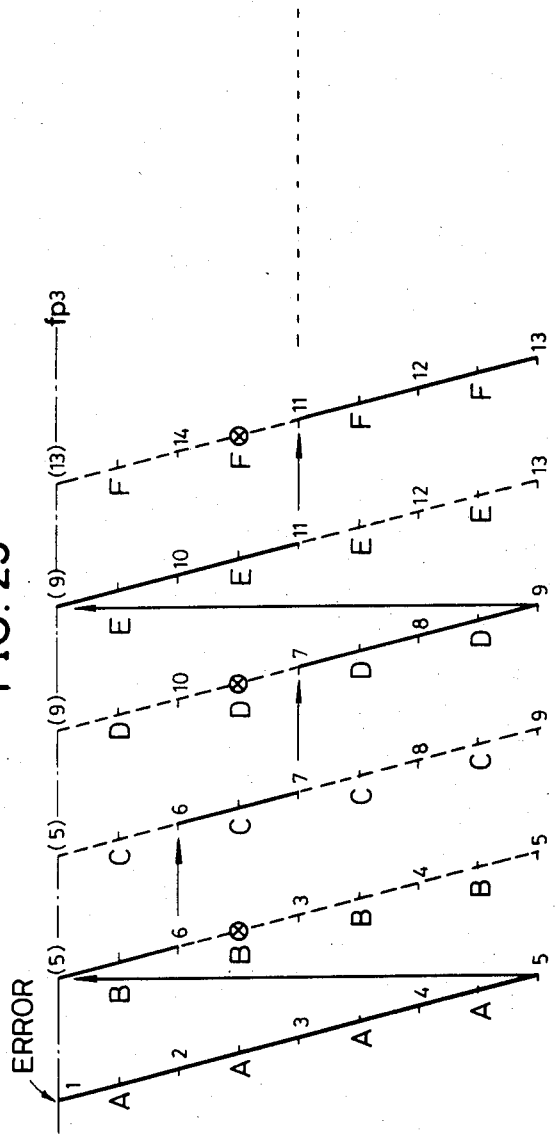
FIG. 25 diagrammatically shows an example of a relationship between a track scanning locus and a signal recorded in the track upon normal reproduction of the rotary recording medium shown in FIG. 6, when the track shift address signal could not be reproduced.

The above description was given with respect to the operation upon normal reproduction when the above kick address signals $A_{K1a}$ and $A_{K1b}$ are reproduced. However, due to some causes such as dropout and the like, it may not be possible to reproduce the kick address signal $A_{K1a}$ or the kick address signal $A_{K1b}$. Because the disc reproducing apparatus is constructed so that the kick is not performed when the kick address signal $A_K$ is not reproduced, in the above case, the kick address signal $A_{K1b}$ and $A_{K2b}$ which are recorded on the track succeeding the recording track of the kick address signals $A_{K1a}$ and $A_{K2a}$ which were not reproduced, are reproduced. For example, if the kick address signals $A_{K1a}$ and $A_{K2a}$ recorded on the outermost peripheral track as shown in FIG. 6 are not reproduced, the outermost track is reproduced without a kick, and the kick address signals $A_{K1b}$ and $A_{K2b}$ on the succeeding track are reproduced as shown in FIG. 25. The kick address signal reproducing circuit 65 decodes the codes of the above kick address signals $A_{K1b}$ and $A_{K2b}$. As described above, these kick address signals $A_{K1b}$ and $A_{K2b}$ instruct a kick in the forward direction at the vertical blanking period recording parts b and c. Thus, the reproducing stylus 52 is kicked towards the inner periphery of the disc at the vertical blanking period recording part b of the second track from the outermost peripheral track among the tracks shown in FIG. 6, and kicked towards the inner periphery of the disc at the vertical blanking period recording part c of the third track from the outermost peripheral track. Then, the reproducing stylus 52 reproduces the kick address signals $A_{K1a}$ and $A_{K2a}$ recorded at the vertical blanking period recording part a of the fourth track from the outermost peripheral track. When these kick address signals $A_{K1a}$ and $A_{K2a}$ are reproduced, the reproducing stylus 52 thereafter scans over the scanning locus upon normal reproduction which is shown in FIG. 22. The scanning locus of the reproducing stylus 52 in this case becomes as indicated by a solid line in FIG. 25, and the order of the picture of the movie film which are reproduced becomes as shown in FIG. 26(A). Furthermore, the order of the divided audio signal parts which are reproduced, becomes as shown in FIG. 26(B).

In the above case, the pictures of the movie film which are to be reproduced in the order A→A→B→B→C→C→... are reproduced in an order A→A→A→A→B→C→... as shown in FIG. 26(A). Hence, a complete normal reproduction picture is not obtained, but this means that the normal reproduction picture can be obtained within a short period of time. In addition, arrows indicated at the lower part of FIG. 26 indicate the kicking positions of the reproducing stylus 52, and a complete audio signal reproduced in a normal manner can be obtained in the above case.

Figure 27:
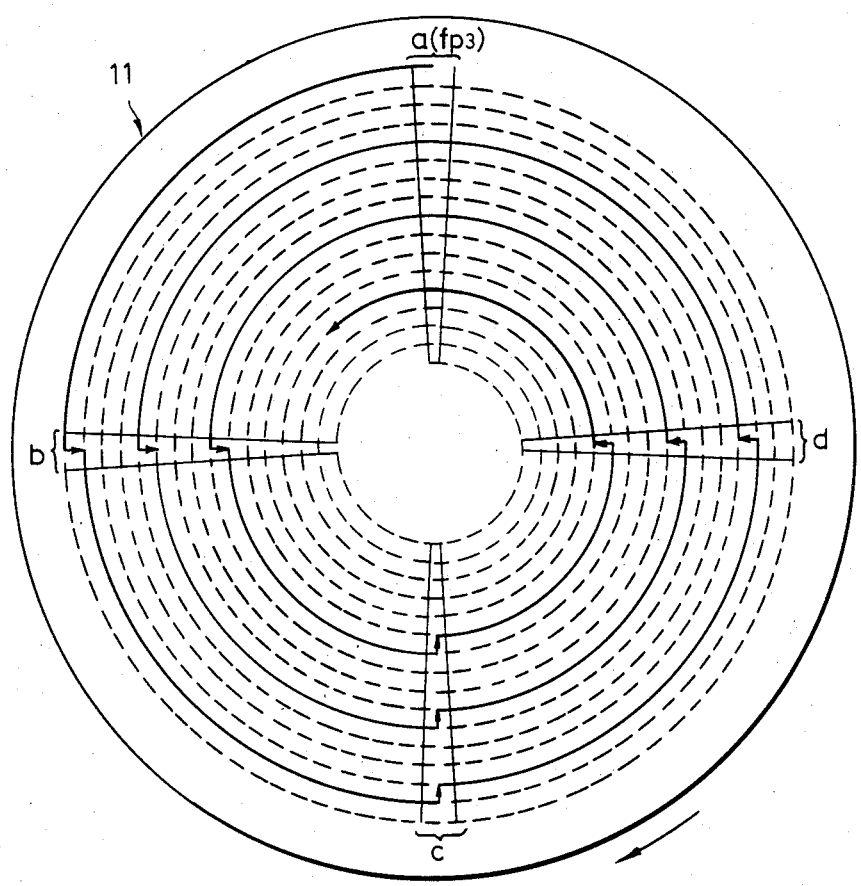
FIG. 27 is a diagram showing an example of a scanning locus of the reproducing stylus when obtaining a normal reproduction picture and normally reproduced audio signal from the rotary recording medium shown in FIG. 10.

Next, when reproducing the disc having the track pattern shown in FIG. 10 under normal reproduction, the reproducing stylus 52 scans over a scanning locus indicated by a solid line in FIG. 27. In this case, every third track is reproduced, and the kick address signal $A_{K1}$ is reproduced for every one revolution period of the disc 11.

Figure 28:
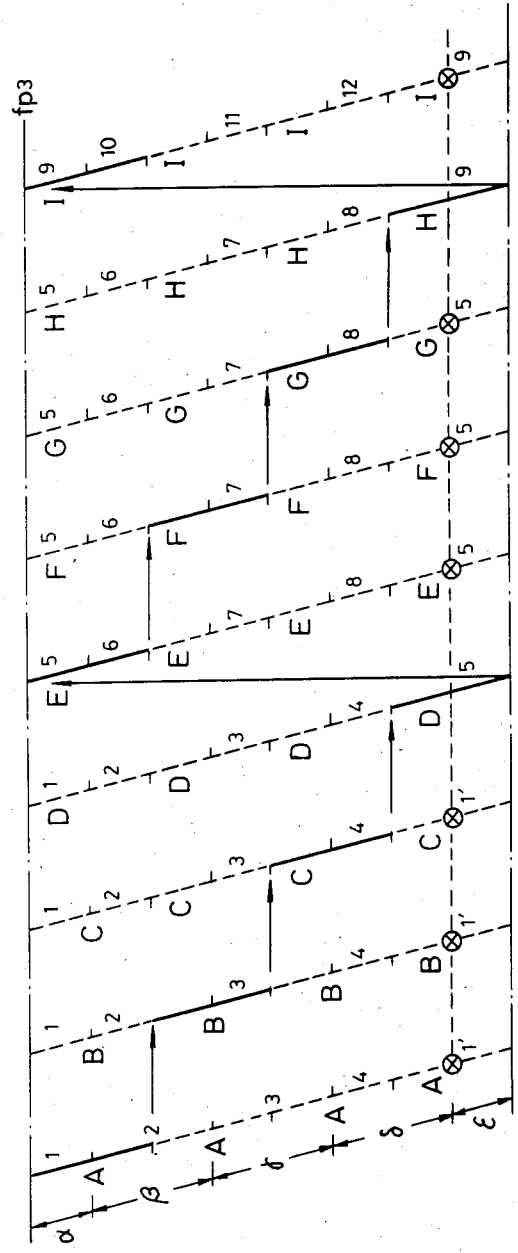
FIG. 28 diagrammatically shows an example of a relationship between a track scanning locus and a signal recorded on the track, when normal reproduction is performed with respect to the rotary recording medium shown in FIG. 10 in a normal manner.
Figure 29:
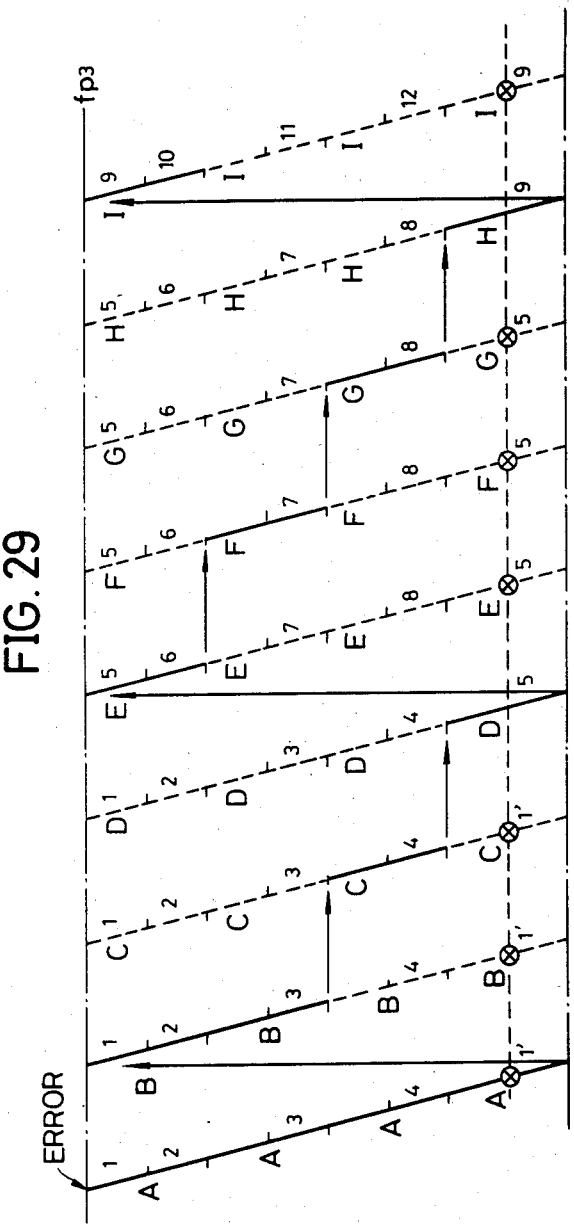
FIG. 29 diagrammatically shows an example of a relationship between a track scanning locus and a signal recorded in the track upon normal reproduction of the rotary recording medium shown in FIG. 10, when the track shift address signal could not be reproduced.

FIG. 28 shows the relationship between the scanning locus of the reproducing stylus 52 and the recorded signals on the tracks which are reproduced in this case. In FIG. 28 and FIG. 29 which will be described hereinafter, those parts which are the same as those corresponding parts in FIG. 10 are designated by the same reference numerals and characters. As clearly understood from FIGS. 27 and 28, the reproducing stylus 52 successively reproduces signals in 1-field period of the recorded color video signal in an order A→B→C→D→E→F→G→..., for every 1-field period, in the order of the fields. As a result, a complete normal reproduction picture can be obtained.

On the other hand, with respect to the audio signal, the divided audio signal parts are reproduced in the divided order as can be seen from FIG. 28, and the audio signal is reproduced in a normal manner. Moreover, in this case, the kicking positions of the reproducing stylus 52 are within the vertical blanking period recorded parts b, c, and d, at positions avoiding the discontinuous points of the audio signal indicated by the mark ⊗ in FIGS. 10 and 28. Accordingly, even if the kicking position is slightly deviated due to some cause, the reproduced sound does not becomes discontinuous, and the audio signal can be continuously reproduced in a normal manner.

If the kick address signal $A_{K1}$ recorded on the outermost peripheral track shown in FIG. 10 is not reproduced, for example, the outermost peripheral track is reproduced without a kick as shown in FIG. 29, and thereafter, the kick address signal $A_{K2}$ within the vertical blanking period recording part a of the succeeding track is reproduced. As stated above, the kick address signal $A_{K2}$ instructs a kick in the forward direction at the vertical blanking period recording parts c and d. Hence, the reproducing stylus 52 is kicked towards the inner periphery of the disc at the vertical blanking period recording part c of the second track from the outermost peripheral track, and kicked towards the inner periphery of the disc at the vertical blanking period recording part d of the third track from the outermost peripheral track. Then, the reproducing stylus 52 reproduces the kick address signal $A_{K1}$ recorded at the vertical blanking period recording part a of the fourth track from the outermost peripheral track. When this kick address signal $A_{K1}$ is reproduced, the reproducing stylus 52 thereafter scans over the scanning locus upon normal reproduction shown in FIG. 28. The scanning locus of the reproducing stylus 52 in this case becomes as indicated by a solid line in FIG. 29, and the normal reproduction picture can be obtained within a short period of time.

Figure 30:
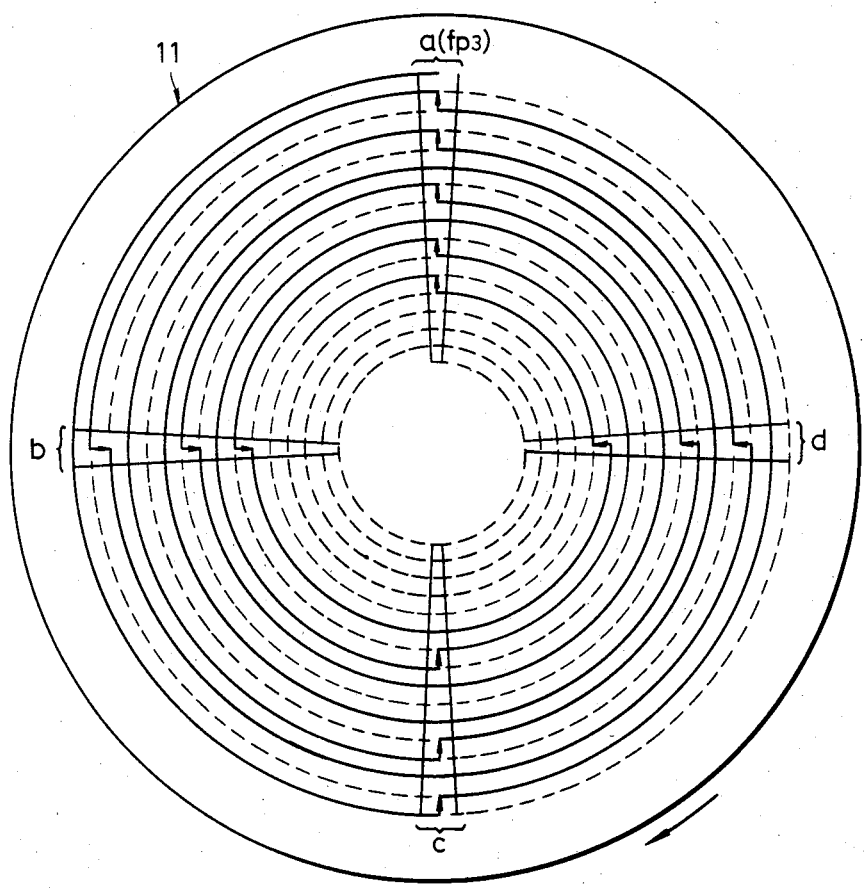
FIG. 30 is a diagram showing an example of a scanning locus of the reproducing stylus when obtaining a normal reproduction picture and normally reproduced audio signal from the rotary recording medium shown in FIG. 13.
Figure 31:
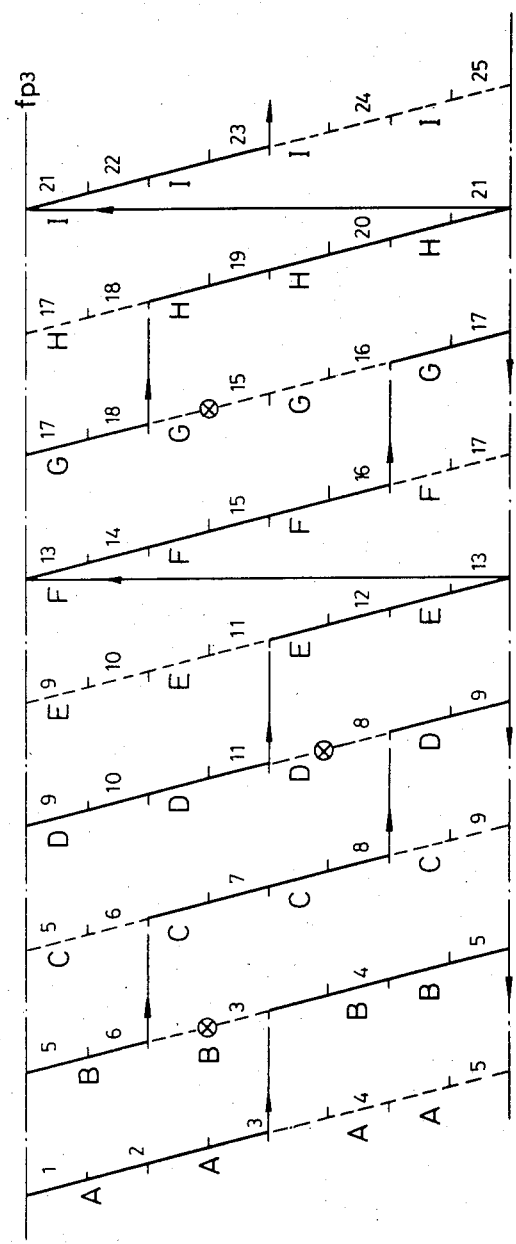
FIG. 31 diagrammatically shows an example of a relationship between a track scanning locus and a signal recorded on the track, when normal reproduction is performed with respect to the rotary recording medium shown in FIG. 13 in a normal manner.

Next, when reproducing the disc having the track pattern shown in FIG. 13 under normal reproduction, the reproducing stylus 52 scans over a scanning locus indicated by a solid line in FIG. 30. The recorded signals are reproduced in an order shown in FIG. 31. In FIG. 31, solid parts of the sloping lines indicate the track parts which are reproduced. Further, leftwardly pointing arrows indicate kicks to the vertical blanking period recording part a of the same track. As clearly seen from FIGS. 30 and 31, the reproducing stylus 52 reproduces the pictures of the recorded movie film by repeatedly reproducing the color video signal of the same picture for 2-field period and then repeatedly reproduces the succeeding color video signal of the same picture for 3-field period, in an order A→A→B→B→B→C→C→D→D→D→E→E→F→F→. . . , for every 1-field period. Accordingly, a normal reproduction picture having no time-base deviation is obtained, which is in accordance with the known 2-3 pull-down system.

On the other hand, with respect to the audio signal, the divided audio signal parts are reproduced in the divided order as can be seen from FIG. 31, and the audio signal is reproduced in a normal manner. Moreover, in this case, the kicking positions of the reproducing stylus 52 are within the vertical blanking period recorded part c at a position avoiding the discontinuous points of the audio signal indicated by the mark ⊗ in FIG. 31. Accordingly, even if the kicking position is slightly deviated due to some cause, the reproduced sound does not becomes discontinuous, and the audio signal can be continuously reproduced in a normal manner.

Figure 20:
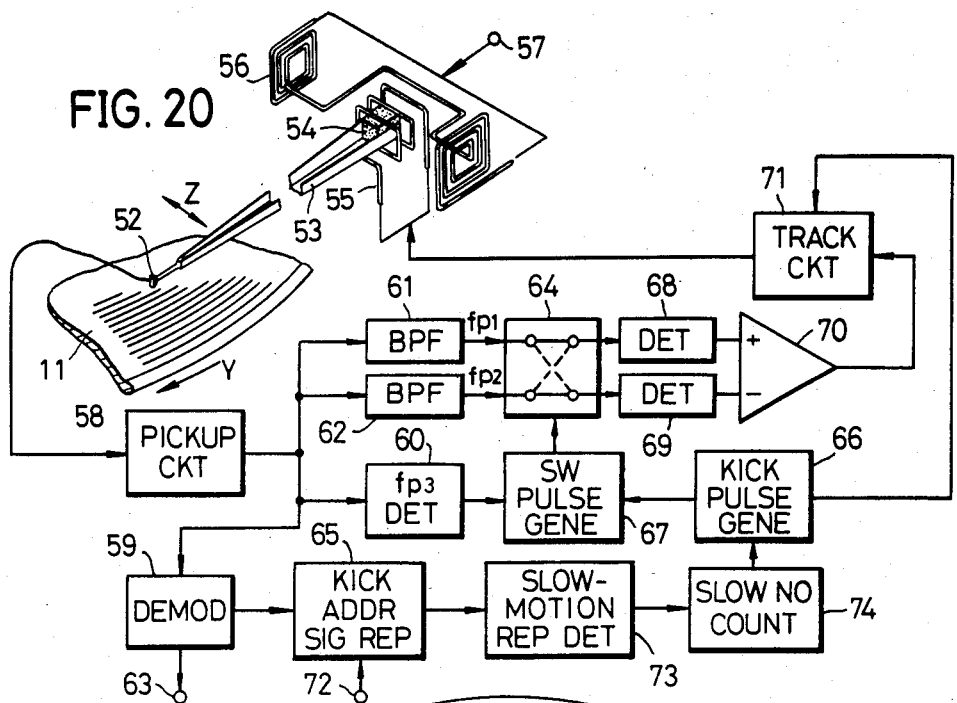
FIG. 20 is a systematic block diagram showing a second embodiment of a rotary recording medium reproducing apparatus according to the present invention.

Next, description will be given with respect to a disc reproducing apparatus for reproducing the disc recorded with the kick address signal shown in FIG. 17, by referring to FIG. 20. In FIG. 20, those parts which are the same as those corresponding parts in FIG. 18 are designed by the same reference numerals, and their description will be omitted. The kick address signal reproducing circuit 65 operates when the slow-motion reproduction most signal is supplied to the terminal 72. The output signal of the kick address signal reproducing circuit 65 is supplied to a slow-motion reproduction detector 73 wherein it is detected that the input kick address signal $A_K$ is an address signal for slow-motion reproduction. A slow number counter 74 is operated by a detection signal from the slow-motion reproduction detector 73. This slow number counter 74 supplies a signal having a period in accordance with the value "X" of the track number code 48 to the kick pulse generator 66, to control the generation of the kick pulse. Hence, the kick pulse for kicking the reproducing stylus 52 to a track on the outer periphery of the disc 11 by one track within the vertical blanking period recording part a, is applied to the tracking coil 55 from the kick pulse generator 66, through the tracking circuit 71. The switching pulse generator 67 detects that the timing of the incoming kick pulse substantially coincides with the input timing of the output signal of the detector 60, and continuously holds the polarity of the switching pulse to that previously obtained. Therefore, the reproducing stylus 52 is controlled so as to scan the disc 11 over the scanning locus indicated by the solid line in FIG. 21. As a result, still color picture of the same picture which is reproduced from the same track, is accordingly reproduced.

The above described operation is repeated for a predetermined number of times determined by the above value "X", the still color picture of the same picture is reproduced from the same track for the predetermined number of times. When repetitive reproduction of the same track for the predetermined number of times is completed, the kick pulse is not generated, and the reproducing stylus 52 begins to reproduce the succeeding track without being kicked towards the outer peripheral direction of the disc at the vertical blanking period recording part a. After reproducing this succeeding track, the reproducing stylus 52 is kicked back towards the outer periphery of the disc every time the reproducing stylus 52 passes by the vertical blanking period recording part a, for the predetermined number of times. Thereafter, the above described operations are repeated. Thus, a slow-motion reproduction picture of a predetermined slow-motion reproduction ratio is obtained as a whole, by reproducing each track by the predetermined number of times in accordance with the value "X" of the track number code 48. In this slow-motion reproduction picture, completely still picture information obtained by repeatedly reproducing the same picture or the same field, is reproduced for the predetermined number of times, and then reproducing the still picture information of the succeeding picture or field. Therefore, a high quality slow-motion reproduction picture is obtained in which there are no unnatural movements.

The disc according to the present invention is not limited to those having the track patterns shown in FIGS. 6, 10, and 13. For example, the kick address signal $A_K$ may be recorded at one or two positions among the vertical blanking period recording parts b, c, and d. In addition, the kick address signal $A_K$ was recorded at the position where the reproducing stylus 52 is kicked upon still-picture reproduction, that is, within the vertical blanking period recording part a wherein the third reference signal fp3 is recorded. However, the kick address signal $A_K$ may be recorded within other recording parts, that is, the vertical blanking period recording part b, c, or d. Furthermore, because the track should be reproduced under normal reproduction when the track number code 48 is "0", the scanning locus of the reproducing stylus 52 may be changed by discriminating the track to be reproduced under normal reproduction on the reproducing apparatus side.

The values of the disc discriminating codes 45a and 45b were described as being "AA" in hexadecimal number, but for example, the disc discriminating codes of the kick address signal $A_{K1}$ may be set to "BF" and the disc discriminating codes of the other kick address signals $A_{K2}$ through $A_{K8}$ may be set to "BB". In this case, the above values "BF" and "BB" may be preset and stored within the reproducing apparatus, so that the desired scanning locus is obtained by decoding the values of the above codes 45a and 45b, without the need to decode the codes 46 through 48. Moreover, in the case of a disc for slow-motion reproduction, the values of the codes 45a and 45b may be set to "DD".

The above recording audio signal is a 2-channel audio signal. Hence, one audio channel may be arranged and successively recorded according to the scanning locus upon normal reproduction, and the other audio channel may be used for other purposes such as for obtaining an audio signal reproduced in a normal manner upon slow-motion reproduction. In addition, description was given above with respect to an example of a disc previously proposed in an application in which the assignee is the same as that of the present application. However, the disc and disc reproducing apparatus according to the present invention may be applied to other discs such as a disc in which the reference signals fp1 through fp3 are not recorded, and the information is reproduced optically. The present invention is preferably applied to a disc which is recorded with a video signal of four fields or more for one revolution of the disc.

Further, the present invention is not limited to these embodiments, but various variations and modifications may be made without departing from the scope of the present invention.

What is claimed is:

1. A rotary recording medium which is playable in still-picture, slow-motion and normal reproduction modes on a reproducing apparatus which comprises a reproducing element for reproducing signals from the rotary recording medium, said rotary recording medium comprising:

at least one recording surface;

a spiral track formed on said recording surface, said spiral track being made up of a plurality of track turns;

a first video signal related to a unit which is repeatedly recorded with N field periods in each of said track turns, where N is a natural number which is greater than one, said unit being equal to one picture of a movie film;

a track shift address signal recorded in at least one position in each of said track turns with a constant period regardless of whether said unit is one field of the second video signal or one picture of the movie film, said track shift address signal comprising a rotary recording medium discriminating code for indicating a specific track pattern recorded on said rotary recording medium which comprises as recorded signals the first video signal related to the unit which is repeatedly recorded with N field periods in each of said track turns, a kick existence instructing code for indicating the existence of a forced track shift of the reproducing element from one track turn to another track turn, and a kick direction instructing code for indicating the direction of the forced track shift; and divided audio signal segments successively arranged and recorded in accordance with a scanning locus of the reproducing element in the normal reproduction mode of the reproducing apparatus, said divided audio signal segments being obtained by segments of an audio signal, said rotary recording medium having track parts with said divided audio signal segments recorded on at least a part of said recording surface, said first video signal being repeatedly recorded for four field periods in each of said track turns, each of said track turns comprising first through fourth vertical blanking period recorded parts (a, b, c, d), each of said parts being recorded with a vertical blanking period of said first video signal, each of said track turns starting from said first vertical blanking period recorded part (a), an (M+1)-th divided audio signal segment out of said divided audio signal segments extending for eight fields of said first video signal from an intermediate point between said second and third vertical blanking period recorded parts (b, c) on a (2M+2)-th track turn, where M is a natural number including zero, said (M+1)-th divided audio signal segment containing an audio information in a first half part thereof which extends over four fields of said first video signal, said audio information being identical to an audio information which is contained in a latter half part of an M-th divided audio signal segment, said latter half part of said M-th divided audio signal segment extending over four fields of said first video signal, said kick existence instructing code and said kick direction instructing code of said track shift address signal having values such that the forced track shift of the reproducing element in the normal reproduction mode occurs in a (2M+1)-th track turn within said third vertical blanking period recorded part (c) in the inner peripheral direction of said rotary recording medium, so that a normal reproduction picture is obtained together with a continuously reproduced audio signal in response to a 2-2 pull-down performed in the reproducing apparatus, a still picture being obtainable in the still picture reproduction mode when the forced track shift of the reproducing element occurs within said first vertical blanking period recorded part in the outer peripheral direction of said rotary recording medium so as to repeatedly reproduce the same track turn.

2. The rotary recording medium as claimed in claim 1 in which said movie film has twenty-four pictures per second.

3. The rotary recording medium as claimed in claim 1 in which said movie film has thirty pictures per second.

4. The rotary recording medium as claimed in claim 1 in which said track shift address signal further comprises a track number code for indicating the number of times that the same track turn is to be repeatedly reproduced, and said track number code of said track shift address signal has a value such that the forced track shift of the reproducing element in the slow-motion reproduction mode occurs in each track turn within said first vertical blanking period recorded part in the outer peripheral direction of said rotary recording medium, said slow-motion track shift recurring a number of times which is determined by the value of said track number code.

5. A rotary recording medium which is playable in still-picture, slow-motion and normal reproduction modes on a reproducing apparatus which comprises a reproducing element for reproducing signals from the rotary recording medium, said rotary recording medium comprising:
  at least one recording surface;
  a spiral track formed on said recording surface, said spiral track being made up of a plurality of track turns;
  a first video signal related to a unit which is repeatedly recorded with N field periods in each of said track turns, where N is a natural number which is greater than one, said unit being equal to one field of a second video signal;
  a track shift address signal recorded in at least one position in each of said track turns with a constant period regardless of whether said unit is one field of the second video signal or one picture of a movie film, said track shift address signal comprising a rotary recording medium discriminating code for indicating a specific track pattern recorded on said rotary recording medium which comprises as recorded signals the first video signal related to the unit which is repeatedly recorded with N field periods in each of said track turns, a kick existence instructing code for indicating the existence of a forced track shift of the reproducing element from one track turn to another track turn, and a kick direction instructing code for indicating the direction of the forced track shift; and
  divided audio signal segments successively arranged and recorded in accordance with a scanning locus of the reproducing element in the normal reproduction mode of the reproducing apparatus, said divided audio signal segments being obtained by segmenting an audio signal,
  said rotary recording medium having track parts with said divided audio signal segments recorded on at least a part of said recorded surface,
  said first video signal being repeatedly recorded for four field periods in each of said track turns, each of said track turns comprising first through fourth vertical blanking period recorded parts (a, b, c, d), each of said vertical blanking periods containing a recorded vertical blanking period of said first video signal, each of said track turns starting from said first vertical blanking period recorded part (a), a (3M+1)-th divided audio signal segment out of said divided audio signal segments extending for four fields of said first video signal beginning with an intermediate point between said fourth and first vertical blanking period recorded parts (d, a) on a (4M+1)-th track turn, where M is a natural number including zero, a (3M+2)-th divided audio signal segment out of said divided audio signal segments extending for four fields of said first video signal beginning with an intermediate point between said fourth and first vertical blanking period recorded parts (d, a) on a (4M+2)-th track turn, a (3M+3)-th divided audio signal segment out of said divided audio signal segments extending for eight fields of said first video signal beginning with an intermediate point between said fourth and first vertical blanking period recorded parts (d, a) on a (4M+3)-th track turn, said (3M+3)-th divided audio signal segment containing in a first half part thereof extending for four fields of said first video signal an audio information which is identical to the audio information contained in each of 3M-th, (3M+1)-th and (3M+2)-th divided audio signal segments,
  said kick existence instructing code and said kick direction instructing code of said track shift address signal having values such that the forced track shift of the reproducing element in the normal reproduction mode occurs in a (4M+1)-th track turn within said second vertical blanking period recorded part (b) in the inner peripheral direction of said rotary recording medium, a (4M+2)-th track turn within said third vertical blanking period recorded part (c) in said inner peripheral direction and a (4M+3)-th track turn within said fourth vertical blanking period recorded part (d) in said inner peripheral direction, so that a normal reproduction picture is obtained together with a continuous reproduced audio signal.

6. The rotary recording medium as claimed in claim 5 in which said track shift address signal further comprises a track number code for indicating the number of times the same track turn is to be repeatedly reproduced, and said track number code of said track shift address signal has a value such that the forced track shift of the reproducing element in the slow-motion reproduction mode occurs in each track turn within said first vertical blanking period recorded part in the outer peripheral direction of said rotary recording medium for a number of times which is determined by the value of said track number code.

7. A rotary recording medium which is playable in still-picture, slow-motion and normal reproduction modes on a reproducing apparatus which comprises a reproducing element for reproducing signals from the rotary recording medium, said rotary recording medium comprising:
  at least one recording surface;
  a spiral track formed on said recording surface, said spiral track being made up of a plurality of track turns;
  a first video signal related to a unit which is repeatedly recorded with N field periods in each of said track turns, where N is a natural number which is greater than one, said unit being equal to one picture of a movie film;
  a track shift address signal recorded in at least one position in each of said track turns with a constant period regardless of whether said unit is one field of the second video signal or one picture of the movie film, said track shift address signal comprising a rotary recording medium discriminating code for indicating a specific track pattern recorded on said rotary recording medium which comprises as recorded signals the first video signal related to the unit which is repeatedly recorded with N field periods in each of said track turns, a kick existence instructing code for indicating the existence of a forced track shift of the reproducing element from one track turn to another track turn, and a kick direction instructing code for indicating the direction of the forced track shift; and divided audio signal segments successively arranged and recorded in accordance with a scanning locus of the reproducing element in the normal reproduction mode of the reproducing apparatus, said divided audio signal segments being obtained by segmenting an audio signal, said rotary recording medium having track parts with said divided audio signal segments recorded on at least a part of said recording surface, said first video signal being repeatedly recorded with four field periods in each of said track turns, said movie film having twenty-four pictures per second, each of said track turns comprising first through fourth vertical blanking period recorded parts (a, b, c, d), each of said vertical blanking period containing a recorded vertical blanking period of said first video signal, each of said track turns starting from said first vertical blanking period recorded part (a), a $(3M+1)$-th divided audio signal segment out of said divided audio signal segments extending over nine fields of said video signal beginning with an intermediate point between said second and third vertical blanking period recorded parts (b, c) on a $(8M+2)$-th track turn, where M is a natural number including zero, a $(3M+2)$-th divided audio signal segment out of said divided audio signal segments extending over eleven fields of said first video signal beginning with an intermediate point between said third and fourth vertical blanking period recorded parts (c, d) on a $(8M+4)$-th track turn, a $(3M+3)$-th divided audio signal segment out of said divided audio signal segments extending for twelve fields of said first video signal beginning with an intermediate point between said second and third vertical blanking period recorded parts (b, c) on a $(8M+7)$-th track turn, each of said divided audio signal segments containing in a first part thereof extending over four fields of said first video signal an audio information identical to the audio information contained in a last part of an immediately preceding divided audio signal segment, which last part of said immediately preceding divided audio signal segment extending over four fields of said first video signal, said kick existence instructing code and said kick direction instructing code of said track shift address signal having values such that the forced track shift of the reproducing element in the normal reproduction mode occurs within said second through fourth vertical blanking period recorded parts (b, c, d) in selected track turns in the inner peripheral direction of said rotary recording medium and within said first vertical blanking period recorded part (a) in selected track turns in the outer peripheral direction of said rotary recording medium, so that a normal reproduction picture is obtained together with a continuous reproduced audio signal by a 2-3 pull-down performed in the reproducing apparatus.

8. The rotary recording medium as claimed in claim 7 in which said track shift address signal further comprises a track number code for indicating the number of times that the same track turn is to be repeatedly reproduced, and said track number code of said track shift address signal has a value such that the forced track shift of the reproducing element in the slow-motion reproduction mode occurs in each track turn within said first vertical blanking period recorded part in the outer peripheral direction of said rotary recording medium for a number of times determined by the value of said track number code.

* * * * *